(12) United States Patent
Worrell et al.

(10) Patent No.: US 8,873,177 B2
(45) Date of Patent: Oct. 28, 2014

(54) HARDWARE-BASED METHODS AND APPARATUS FOR INTER-TRACK INTERFERENCE MITIGATION IN MAGNETIC RECORDING SYSTEMS

(75) Inventors: Kurt J. Worrell, Berthoud, CO (US); Erich F. Haratsch, Bethlehem, PA (US); Changyou Xu, Fremont, CA (US); Jefferson E. Singleton, Westminister, CO (US); Kripa Venkatachalam, Concord, MA (US); David G. Springberg, Fort Collins, CO (US)

(73) Assignee: LSI Corporation, San Jose, CA (US)

(*) Notice: Subject to any disclaimer, the term of this patent is extended or adjusted under 35 U.S.C. 154(b) by 258 days.

(21) Appl. No.: 13/250,246

(22) Filed: Sep. 30, 2011

(65) Prior Publication Data
US 2013/0083417 A1   Apr. 4, 2013

(51) Int. Cl.
*G11B 5/09*      (2006.01)
*G11B 5/012*     (2006.01)
*G11B 19/04*     (2006.01)

(52) U.S. Cl.
CPC *G11B 5/09* (2013.01); *G11B 5/012* (2013.01); *G11B 19/045* (2013.01)
USPC ................... 360/39; 360/25; 360/45; 360/55

(58) Field of Classification Search
None
See application file for complete search history.

(56) References Cited

U.S. PATENT DOCUMENTS

| | | | | |
|---|---|---|---|---|
| 5,459,679 A | * | 10/1995 | Ziperovich | 708/3 |
| 6,909,566 B1 | * | 6/2005 | Zaitsu et al. | 360/31 |
| 7,623,312 B2 | * | 11/2009 | Ehrlich | 360/71 |
| 7,685,360 B1 | * | 3/2010 | Brunnett et al. | 711/112 |
| 7,729,071 B2 | * | 6/2010 | Harada | 360/39 |
| 8,300,339 B1 | * | 10/2012 | Nangare et al. | 360/39 |
| 8,488,264 B2 | * | 7/2013 | Yoshida et al. | 360/51 |
| 8,638,513 B1 | * | 1/2014 | Burd | 360/39 |
| 8,659,847 B1 | * | 2/2014 | Yeung et al. | 360/53 |
| 8,665,543 B2 | * | 3/2014 | Bellorado et al. | 360/45 |
| 2005/0180039 A1 | | 8/2005 | Mayergoyz et al. | |
| 2005/0264906 A1 | | 12/2005 | Haratsch | |
| 2007/0047131 A1 | | 3/2007 | Berman et al. | |
| 2007/0104078 A1 | | 5/2007 | Yin et al. | |
| 2012/0063022 A1 | | 3/2012 | Mathew et al. | |
| 2012/0063023 A1 | * | 3/2012 | Mathew et al. | 360/45 |
| 2012/0162806 A1 | * | 6/2012 | Champion et al. | 360/53 |

OTHER PUBLICATIONS

Roh et al., Single-Head/Single-Track Detection in Interfering Tracks, IEEE Transactions on Magnetics, vol. 38, No. 4, pp. 1830-1838 (Jul. 1, 2002).

Cassuto et al., "Indirection Systems for Shingled-Recording Disk Drives," 26th IEEE Conference on Mass Storage Systems and Technologies, (May 3-7, 2010).

* cited by examiner

*Primary Examiner* — Dismery Mercedes
(74) *Attorney, Agent, or Firm* — Ryan, Mason & Lewis, LLP

(57) ABSTRACT

Hardware-based methods and apparatus are provided for inter-track interference mitigation in magnetic recording systems. Inter-track interference (ITI) is mitigated in a magnetic recording system by obtaining ITI cancellation data; and providing the ITI cancellation data to an ITI mitigation circuit using a write data path in the magnetic recording system. The write data path can optionally operate substantially simultaneously with the read data path performing the read operation. The ITI cancellation data comprises, for example, user data and/or media data.

32 Claims, 18 Drawing Sheets

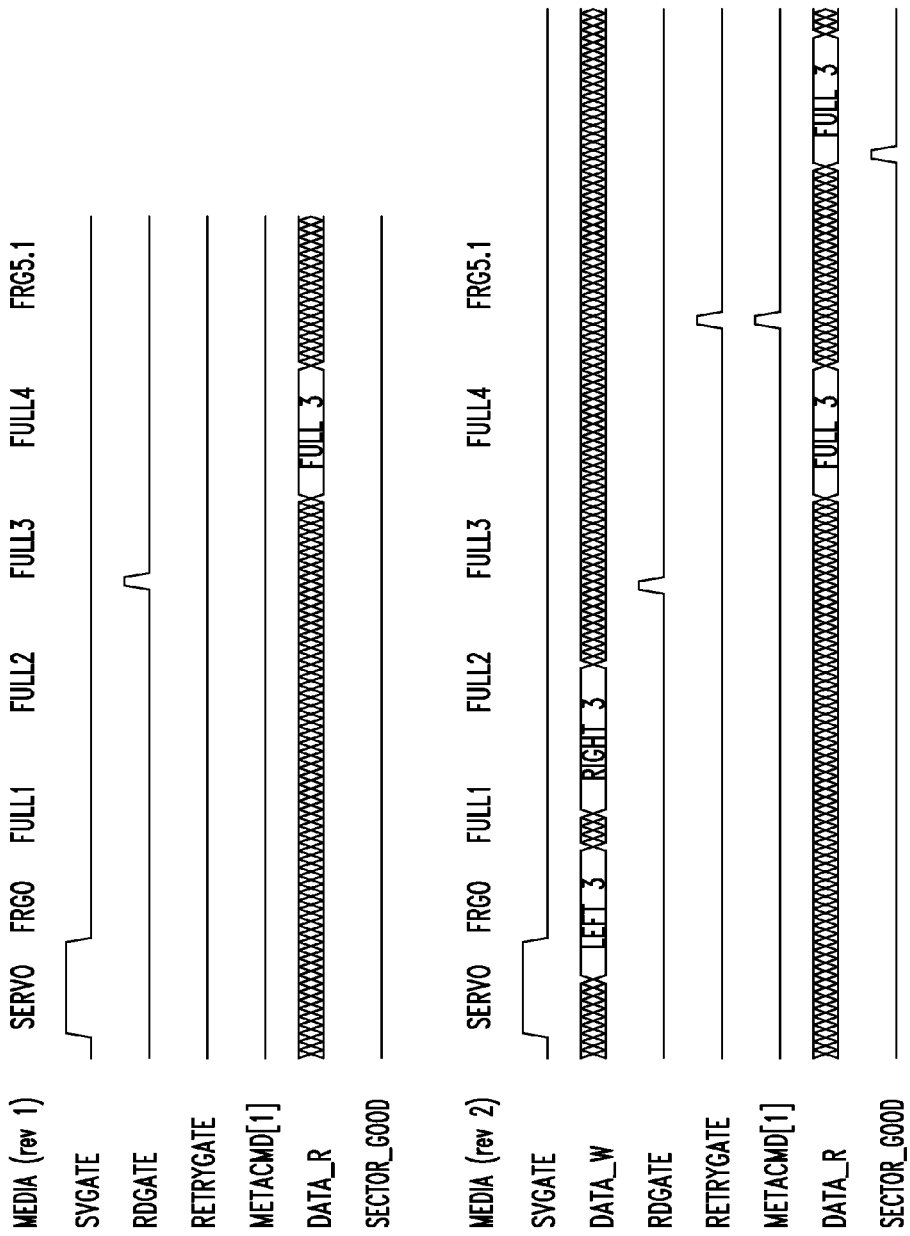

HARDWARE-BASED METHODS AND APPARATUS FOR INTER-TRACK INTERFERENCE MITIGATION IN MAGNETIC RECORDING SYSTEMS

FIELD OF THE INVENTION

The present invention relates generally to magnetic recording systems and, more particularly, to improved techniques for mitigating the effect of inter-track interference in such magnetic recording systems.

BACKGROUND OF THE INVENTION

In magnetic recording (MR) systems, data is typically recorded on concentric circular tracks on a magnetic media as a sequence of small magnetic domains. Data written onto the tracks that neighbor a given track will affect the signal read back from the media of the given track. The signal induced during the read of the given track as a result of one or more neighboring tracks is referred to as crosstalk or inter-track interference (ITI). The mitigation of the ITI noise caused by the neighboring tracks in the read back signal of the given track typically relies on information about the data pattern from the neighboring tracks supplied to an ITI mitigation circuit or process.

ITI is of particular concern in hard disk drives (HDD) where concentric or spiral tracks of data are recorded on the media in close proximity to one another, relative to the size of the head. The capacity of the disk drive is increased by placing the tracks closer together. ITI is known to increase with technology scaling, however, and becomes a significant source of noise as track separation distances become smaller. As the tracks are placed closer together, the neighboring tracks are more likely to influence the signal of the given track when it is read back from the media, reducing the overall signal-to-noise ratio. ITI thus limits the number of tracks that can reliably be stored in a given area of a magnetic medium. ITI is of even greater concern in Shingled Magnetic Recording (SMR) systems, where the tracks are placed close enough that the tracks touch one another in some cases, and in other cases can even overlap one another when written with data.

A number of techniques have been proposed for mitigating the effect of ITI in magnetic recording systems. In existing SMR implementations, for example, the mitigation process is typically performed by software in the hard disk controller (HDC). It has been found, however, that when ITI mitigation is enabled, the HDC cannot process data fast enough to recover more than a few sectors (and typically only one sector) for every 3-6 revolutions of the disk. Each revolution of the disk, however, may contain, for example, 500 or more sectors (depending on, e.g., the particular disk drive that is employed, the size of the platter and the radial position of each track on the disk).

A need therefore exists for improved techniques for mitigating the effect of ITI. A further need exists for hardware-based techniques for mitigating the effect of ITI. Yet another need exists for hardware-based techniques for mitigating the effect of ITI that do not require a hard disk controller to perform the ITI computations.

SUMMARY OF THE INVENTION

Generally, hardware-based methods and apparatus are provided for inter-track interference mitigation in magnetic recording systems. According to one aspect of the invention, inter-track interference (ITI) is mitigated in a magnetic recording system by obtaining ITI cancellation data; and providing the ITI cancellation data during a read operation to an ITI mitigation circuit using a write data path in the magnetic recording system. The write data path can optionally operate substantially simultaneously with the read data path performing the read operation.

The ITI cancellation data can be obtained, for example, from a memory that is external to the write data path. The ITI cancellation data comprises, for example, user data and/or media data. In one embodiment, the write data path converts user data to media data for the ITI mitigation.

The ITI mitigation can be selectively enabled for a given sector of data. In addition, the ITI mitigation can be selectively performed for a given read operation for one or more neighboring tracks. The ITI mitigation can optionally be performed in combination with a post-processing procedure to post-process ITI corrected data and/or perform ITI mitigation on post-processed data.

A more complete understanding of the present invention, as well as further features and advantages of the present invention, will be obtained by reference to the following detailed description and drawings.

DETAILED DESCRIPTION

The present invention provides hardware-based methods and apparatus for inter-track interference mitigation in magnetic recording systems. ITI mitigation combines the data read from the media with additional data (hereafter referred to as "cancellation data") in order to improve the likelihood of correct data recovery. The cancellation data must be supplied to the ITI mitigation circuit or process. The cancellation data may be read from the disk media, or obtained from another source, as would be apparent to a person of ordinary skill in the art.

According to one aspect of the invention, the disclosed hardware-based techniques for inter-track interference mitigation obtain the cancellation data from the HDC but do not require the processing unit in the HDC to perform the ITI computations. According to another aspect of the invention, a system is disclosed for storing, supplying and manipulating the cancellation data for presentation to the read data path for subsequent digital signal processing (DSP), thereby improving the chances for correctly recovering the written data.

Read channels are typically slave devices that are in either a read mode or a write mode at a given time. In each mode, data typically flows only in one direction. For example data flows from a hard disk controller (HDC) to the read channel (RC) to the media in a write mode and from the media to the RC and then the HDC in a read mode. The present invention recognizes that at least a portion of the write data path (WDP) is normally idle when the read channel is executing a read operation in a read mode.

Thus, according to a further aspect of the invention, the write data path (which is normally idle or dormant during read operations) is employed to deliver the cancellation data to an ITI mitigation circuit in the read data path. Thus, the write data path is used during read operations to transmit cancellation data into the read channel. The cancellation data is provided to the ITI mitigation circuit substantially simultaneously with the media data that is obtained by the read data path from the magnetic media. Among other benefits, the write data path typically includes functionality to encode, scramble and buffer data, and calculate error correction data (which is subsequently written to the media), and this functionality can be leveraged in accordance with the present invention for ITI mitigation. In this manner, the disclosed ITI mitigation system makes use of otherwise idle hardware and existing buffering capabilities in the write path to enable ITI mitigation, at very minimal design effort, area expense and power costs.

Figure 1:
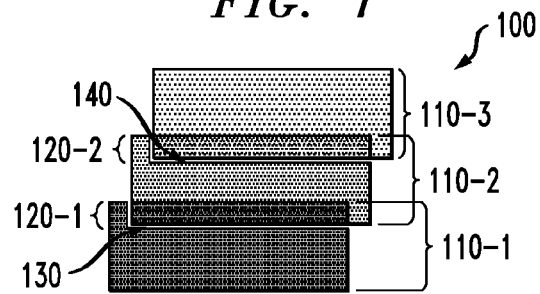
FIG. 1 illustrates a portion of a number of exemplary tracks on a magnetic medium of a Shingled Magnetic Recording (SMR) system.

FIG. 1 illustrates a portion of a number of exemplary tracks 110-1 through 110-3 on a magnetic medium 100 of an exemplary Shingled Magnetic Recording (SMR) system. The tracks 110-1 through 110-3 are typically written in increasing numerical order (such as illustrated from bottom to top in FIG. 1). A number of examples described herein make reference to left and right tracks, which are references to the tracks that are adjacent to the left and right, respectively, to a given track. As shown in FIG. 1, the exemplary tracks 110-1, 110-2 and 110-3 are written with a first overlap region 120-1 between tracks 110-1 and 110-2, and with a second overlap region 120-2 between tracks 110-2 and 110-3. The signal read from track 110-2, for example, is heavily influenced by the signal read from track 110-3 since track 110-3 is written overlapping the previously written track 110-2. The signal read from track 110-2 is also influenced by the data previously written on track 110-1 since the left edge of track 110-2 is written over the right edge of track 110-1. The read signal for track 110-2 depends heavily on the position and size of the read head that is positioned over the tracks to read the recorded data. If the read head is positioned closer to one edge of track 110-2, such as edge 130, than the edge of the other track 110-3, such as edge 140, for example, then the corresponding track 110-1 that is adjacent to edge 130 will affect the read signal of track 110-2 more than the track 110-3 that is adjacent to edge 140. If the read head is the same size or larger than the non-overlapped region of 110-2, both tracks 110-1 and 110-3 are likely to induce ITI noise.

It is noted that one adjacent track can have a more significant (Ti effect than the other adjacent track. For example, the position of the read head over the center track 110-2 relative to the position of the adjacent tracks may influence the amount of ITI contributed by each adjacent track to the center track. Thus, ITI mitigation can optionally be performed first for the adjacent track having the more significant ITI contribution. As discussed further below, the illustrative embodiments described herein do not place any restrictions on using one side track or the other side track, or the order of side tracks if two-sided ITI mitigation is being performed. The disclosed ITI mitigation mechanisms allow for the most important cancellation (if known a priori) to be performed first so as to allow the ITI mitigation process to terminate once successful recovery is achieved.

Figure 2:
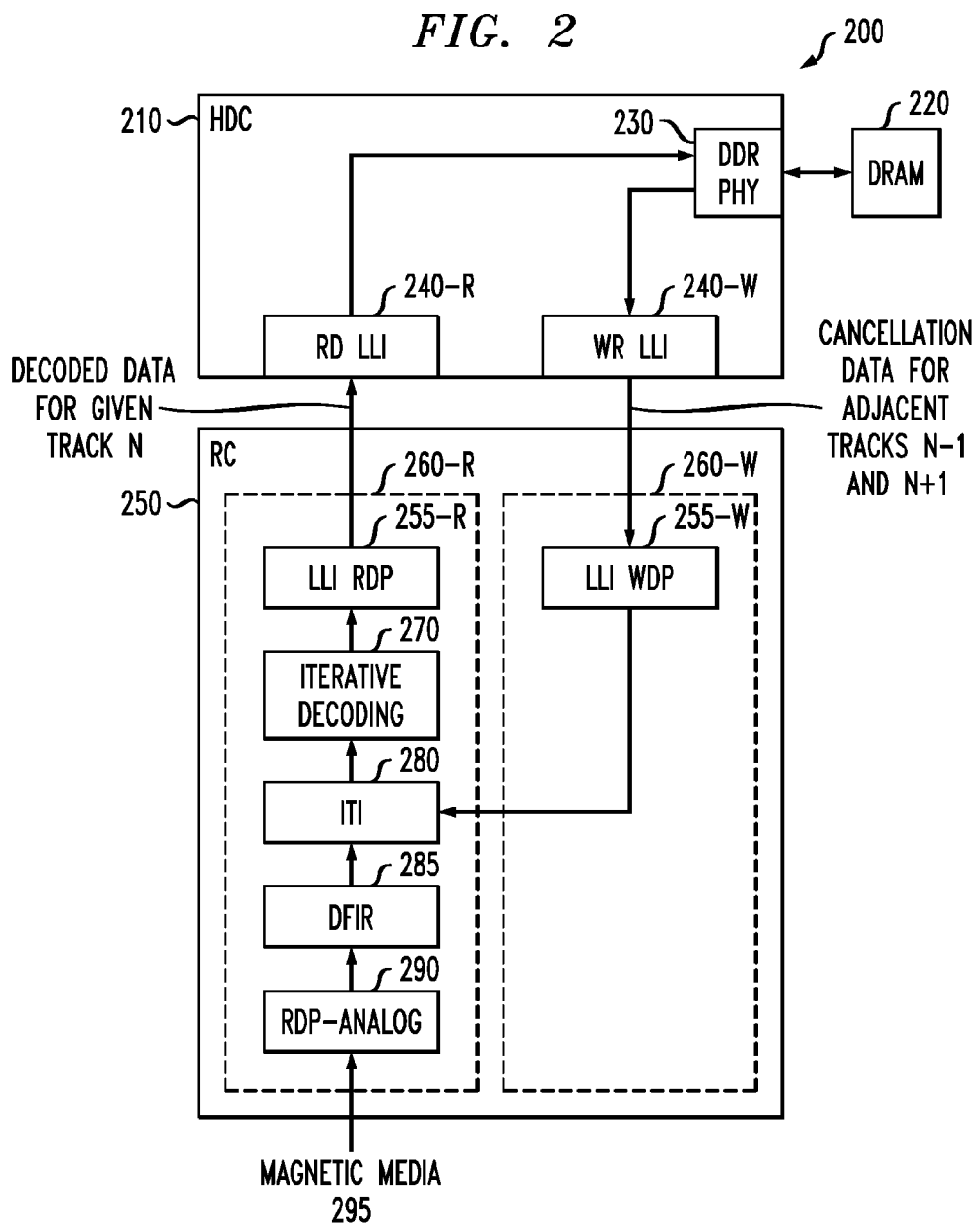
FIG. 2 is a schematic block diagram of a magnetic recording system incorporating ITI mitigation in accordance with the present invention

FIG. 2 is a schematic block diagram of portions of a magnetic recording system 200 incorporating ITI mitigation in accordance with the present invention. FIG. 2 illustrates the configuration of the magnetic recording system 200 for ITI mitigation during a read operation. As shown in FIG. 2, the magnetic recording system 200 comprises a hard disk controller (HDC) 210 and a read channel (RC) 250. The read channel 250 comprises a read data path (RDP) 260-R and a write data path (WDP) 260-W. As previously indicated, the write data path 260-W is employed by the present invention to deliver the cancellation data for one or more adjacent tracks, such as tracks N−1 and N+1, that are adjacent to a given track N to an ITI mitigation circuit 280 in the read data path 260-R. The cancellation data is provided to the ITI mitigation circuit 280 substantially simultaneously with the media data that is obtained by the read data path 260-R from the magnetic media.

Typically, the RDP-Analog block 290 comprises a number of analog components, such as an ac-coupling, attenuator (ACC); a variable gain amplifier (VGA) with adaptive control, baseline compensation, magneto-resist asymmetric (MRA) compensation, thermal asperity (TA) detection; continuous time filter (CTF) with adaptive control for digital signal processing; and an analog to digital converter (ADC). Generally, thermal asperity occurs when the read head encounters a portion of magnetic material that is raised above the plane of the disk platter on which the magnetic material resides, causing the signal amplitude to substantially increase. The thermal asperity detection block identifies such magnetic material portions and attempts to compensate for them, in a known manner.

The digitized signal is then filtered by a Digital Finite Impulse Response (DFIR) filter 285, which equalizes the signal. The DFIR 285 provides a filtered output to the ITI mitigation circuit 280. The ITI-cancelled signals generated by the ITI mitigation circuit 280 are then provided to the iterative decoding block 270 that includes a Viterbi detector and a decoder, such as a low-density parity check decoder. The read data path 260-R provides decoded data for a given track N to the hard disk controller 210.

As previously indicated, the write data path 260-W typically includes functionality to encode the data that is to be written onto the media, such that error correction can be performed on a subsequent read of the data. In addition, the write data path 260-W also scrambles and buffers the data, and this functionality can be leveraged in accordance with the present invention for ITI mitigation.

For a more detailed discussion of an exemplary M mitigation circuit 280, see, for example, U.S. patent application Ser. No. 13/186,174, filed Jul. 19, 2011, entitled "Systems and Methods for Inter-Track Interference Compensation," incorporated by reference herein. A number of exemplary techniques for ITI mitigation in accordance with the present invention are discussed further below in conjunction with FIGS. 5-10. For example, various implementations of the present invention support direct reads of the magnetic media 295, with or without ITI mitigation. In addition, another implementation of the present invention supports on-the-fly (OTF) or real-time reads with at least one-sided ITI mitigation. Yet another implementation of the present invention supports offline reads with up to two-sided ITI mitigation.

The present invention also supports ITI mitigation of post-processed DFIR data, such as Y-Averaged data and/or post-processing of ITI mitigated DFIR data, such as Y-Averaging of ITI mitigated data. For example. ITI mitigation of Y-Averaged data comprises obtaining a Y-Average over multiple reads and then performing ITI mitigation and decoding using the Y-averaged samples. Similarly. Y-Averaging of ITI mitigated data comprises reading a sector, performing ITI mitigation and optionally decoding using the current read sector, and obtaining a Y-Average using the ITI-mitigated samples from multiple reads, followed by a read of a next sector, and so forth.

As shown in FIG. 2, the hard disk controller 210 comprises exemplary long latency interfaces (LLI) 240-R, 240-W for communicating with corresponding long latency interfaces (LLI) 255-R, 255-W in the read data path (RDP) 260-R and write data path (WDP) 260-W, respectively.

The hard disk controller 210 also includes a double data rate (DDR) PHY interface 230 for communicating with external DDR devices, such as a dynamic random access memory (DRAM) 220. The cancellation data can be stored, for example, in the external DRAM 220 or another non-volatile memory, such as a static random access memory (SRAM) or flash memory. The exemplary DRAM 220 can store cancellation data for one or more tracks of the magnetic media 100 (FIG. 1) or magnetic media 295 (FIG. 2). For example, the amount of cancellation data that is stored can be a function of the track spacing for the track currently being read. The exemplary DRAM 220 may also store cancellation data for just one or multiple sectors (for example, the sectors that could not be successfully recovered during a prior read operation) to reduce the amount of data that needs to be stored in DRAM.

Figure 3:
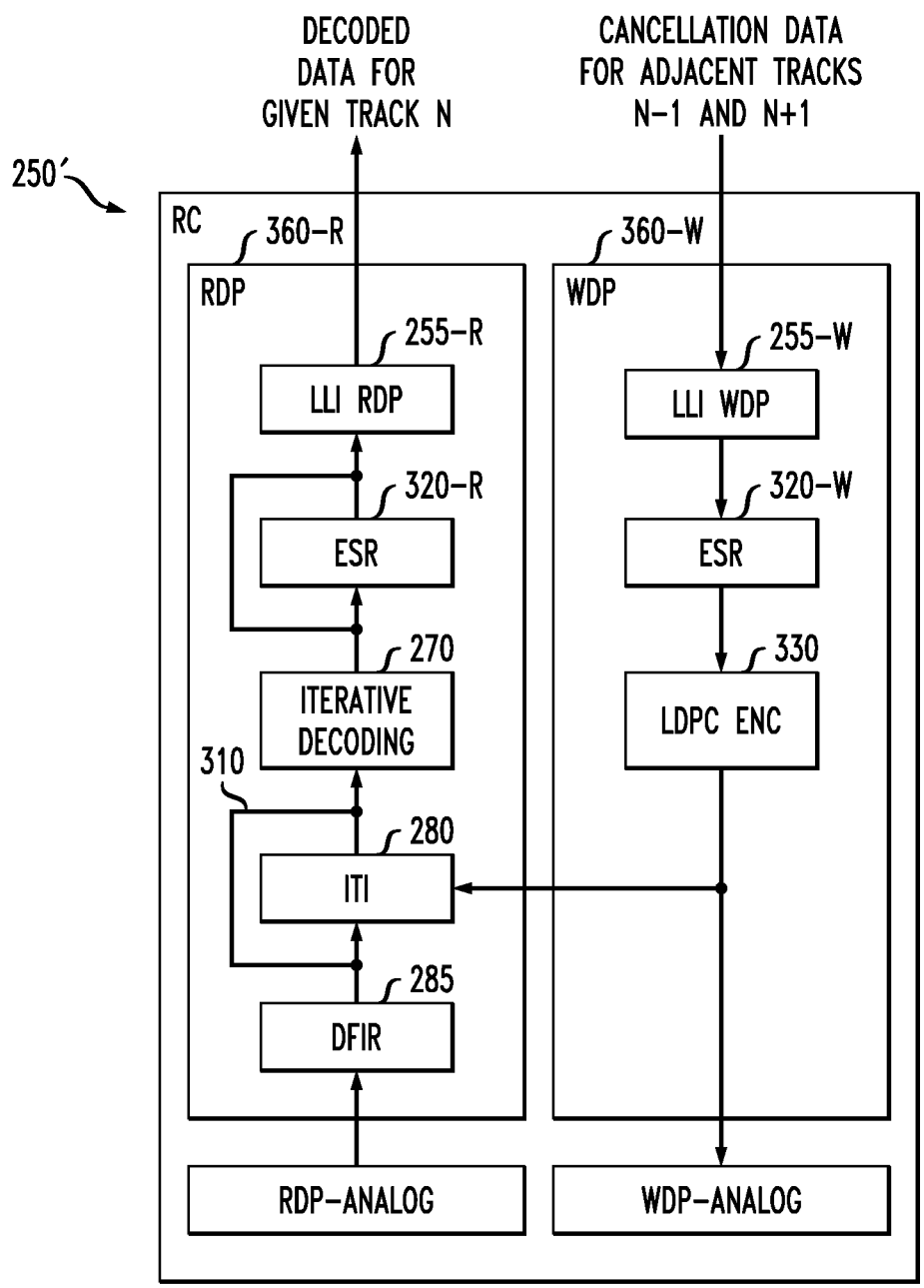
FIGS. 3 and 4 are schematic block diagrams of alternative implementations of the read channel illustrated as part of FIG. 2.
Figure 4:
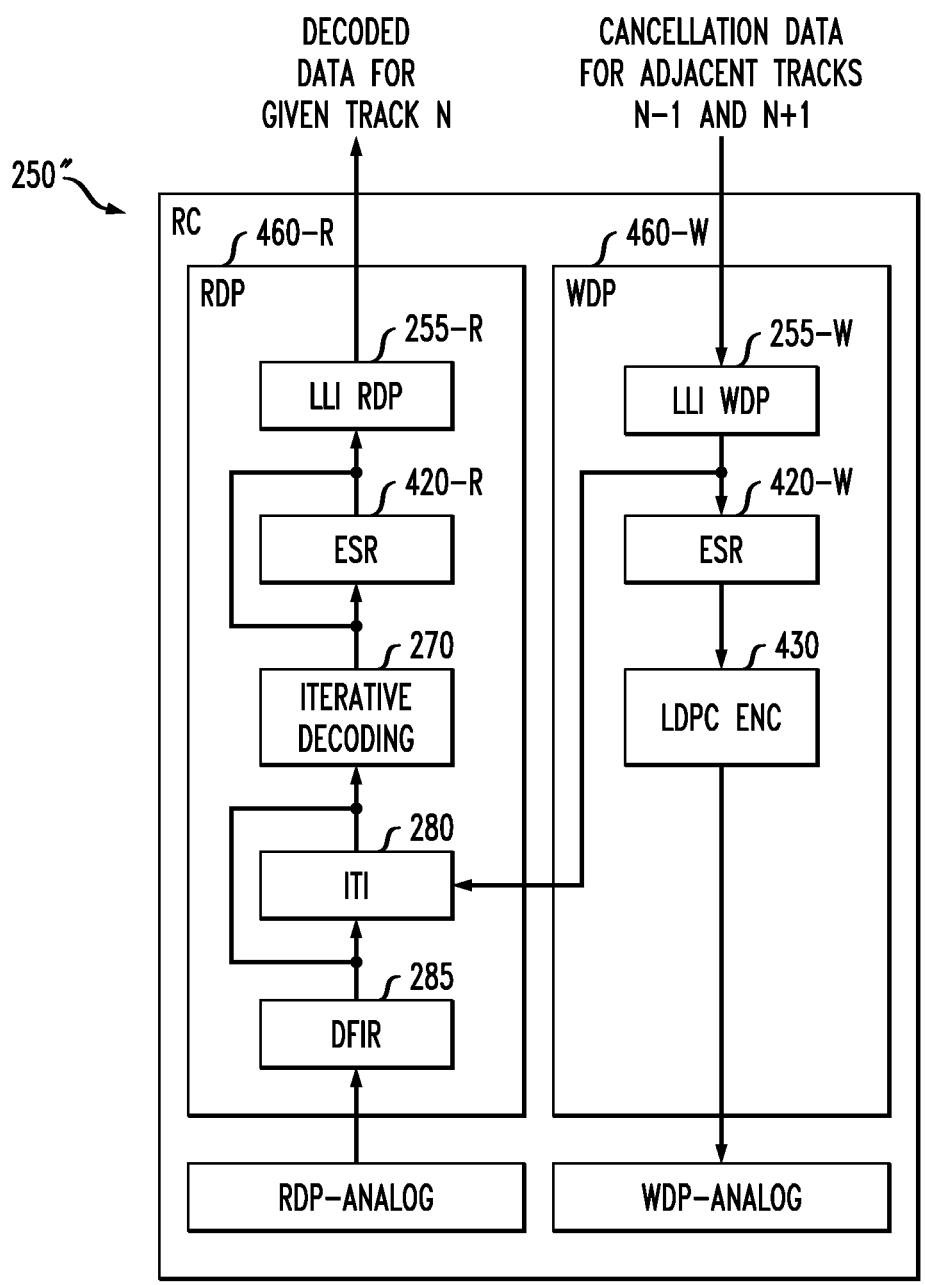

The cancellation data, also referred to as side-track data, can have a number of exemplary formats, as would be apparent to a person of ordinary skill in the art. Generally, the exemplary cancellation data can comprise coded media data that corresponds to the written media waveform, or un-encoded user data which would normally be supplied by the hard disk controller 210. Generally, the exemplary media data format comprises encoded data including Low Density Parity Check (LDPC) overhead, run-length limited (RLL) encoding overhead and error detection code (EDC) overhead. FIGS. 3 and 4 present alternative implementations 250' and 250", respectively, of the read channel 250 that incorporate different embodiments for processing the media data. In FIGS. 3 and 4, the run-length limited and error detection code encoder and decoder functions and the scrambler functions are labeled as "ESR" (i.e., Error Detection Code, Scrambler and RLL).

It is further noted that in the exemplary embodiment, the ITI mitigation circuit 280 processes equalized analog-to-digital converter (ADC) samples, referred to as "Y-Data." In an alternative embodiment, the ITI mitigation circuit 280 may process raw (unequalized) ADC samples, referred to herein as "ADC data." The Y-Data or ADC data, for example, may be 6 bits of data for each media bit that was written on the media. The ADC-data or Y-Data is read from the magnetic media 295 and is available at the output of the ADC or DFIR equalizer, respectively. The iterative decoding block 270 converts each Y-Data sample to a single bit of detected media data (and after removal of parity and other overhead bits) to a single bit of detected user data. The iterative decoding block 270 may be embodied, for example, using a well-known LDPC decoder.

In an exemplary embodiment, the write data path 260-W represents the ITI cancellation data in user or media data format. In an alternative embodiment, the write data path 260-W represents the ITI cancellation data in ADC or Y-data format, in which case multiple bits per media bit are stored in the DRAM and supplied from the HDC to the write data path 260-W. The ITI mitigation circuit 280 mitigates ITI based on media data, ADC data or Y-data depending on what the write data path 260-W supplies. If the HDC provides ITI cancellation data to the read channel in user data format, the write data path converts the user data to media data as described in FIGS. 3 and 4.

It is noted that if the DDR PHY 230 does not have sufficient bandwidth without added expense and system design modifications to support the Y-Data or ADC data format (for example, 6 bits per stored media bit) format, the single bit format, that is user or media data format implementation of the present invention can still be supported. With the single bit format, only one bit unit of bandwidth needs to be added. It is further noted that read data is written to memory in existing non-ITI drives. Thus, only one bandwidth bit unit is added for reading the data from the DDR and sending the cancellation data to the read channel for use in the disclosed ITI cancellation procedure. By using the single bit format, the required storage amount for ITI cancellation data in the DRAM is greatly reduced as well.

In one exemplary embodiment, the magnetic recording system 200 includes an ITI control signal or register, referred to, for example, as METACMD[1] or ITI_GATE, to indicate whether ITI cancellation data should be used for a given read operation. If the ITI control signal indicates that the ITI cancellation data should not be used for a given read operation, then the ITI mitigation circuit 280 can optionally be bypassed (as there is no data to be used for ITI mitigation), as shown further below in FIGS. 3-4. In addition, the exemplary magnetic recording system 200 includes a mode control signal or register, referred to, for example, as ITI_SIDES, to indicate whether ITI cancellation is to be performed for only one adjacent track (for example, ITI_SIDES is net to ITI_SIDES=0) or two adjacent tracks (for example, ITI_SIDES is set to ITI_SIDES=1) in the exemplary embodiment. In general, any number, N, of tracks can have an ITI influence on the center track. In addition, N-sided ITI mitigation can be performed in accordance with the present invention in N steps, as would be apparent to a person of ordinary skill in the art.

FIG. 3 is a schematic block diagram of an alternative implementation 250' of the read channel 250 of FIG. 2, where the write data path generates the media data for presentation to the ITI mitigation circuit 280. As shown in FIG. 3, the exemplary read channel 250' comprises a read data path 360-R and a write data path 360-W, in a similar manner to FIG. 2. The read data path 360-R may be implemented in a similar manner to the read data path 260-R of FIG. 2. As previously indicated, the write data path 360-W is employed by the present invention to deliver the cancellation data to an ITI mitigation circuit 280 in the read data path 360-R. The cancellation data is provided to the ITI mitigation circuit 280 substantially simultaneously with the media data that is obtained by the read data path 360-R from the magnetic media. In another exemplary embodiment, the cancellation data is provided to the ITI mitigation circuit 280 before or after the corresponding media data that is obtained by the read data path 360-R from the magnetic media.

The long latency interfaces (LLI) 255-R, 255-W in the read data path (RDP) 360-R and write data path 360-W, respectively, may be implemented in a similar manner to FIG. 2. In addition, the iterative decoding block 270 and ITI mitigation circuit 280 may be implemented in a similar manner to FIG. 2.

In the exemplary embodiment of FIG. 3, the coded media data is generated by the write data path 360-W. The HDC provides ITI cancellation data to the write data path in user data format. As shown in FIG. 3, the exemplary write data path 360-W comprises an ESR encoder 320-W and an LDPC encoder 330, which encode the user data to coded media data, which is provided to the ITI mitigation circuit as ITI cancellation data. The write data path encodes the user data in a similar fashion as during a write operation to the media.

As shown in FIG. 3, the ITI mitigation circuit 280 in the read data path 360-R can optionally be bypassed when ITI cancellation is not enabled for a given read operation. Furthermore, the ESR encoder 320-R in the read data path 360-R can optionally be bypassed when a media data format is to be recovered.

FIG. 4 is a schematic block diagram of an alternative implementation 250" of the read channel 250 of FIG. 2, where the write data path provides user data to the ITI mitigation circuit 280, and the ITI mitigation circuit 280 generates the media data from the user data. As shown in FIG. 4, the exemplary read channel 250" comprises a read data path 460-R and a write data path 460-W, in a similar manner to FIG. 2. The read data path 460-R may be implemented in a similar manner to the read data path 260-R of FIG. 2. As previously indicated, the write data path 460-W is employed by the present invention to deliver the cancellation data to an ITI mitigation circuit 280 in the read data path 460-R. The cancellation data is provided to the ITI mitigation circuit 280 substantially simultaneously with the media data that is obtained by the read data path 460-R from the magnetic media. In another exemplary embodiment or mode of operation, the cancellation data is provided to the ITI mitigation circuit 280 before or after the media data that is obtained by the read data path 460-R from the magnetic media The long latency interfaces (LLI) 255-R, 255-W in the read data path (RDP) 460-R and write data path 460-W, respectively, may be implemented in a similar manner to FIG. 2. In addition, the iterative decoding block 270 and ITI mitigation circuit 280 may be implemented in a similar manner to FIG. 2.

In the exemplary embodiment of FIG. 4, the coded media data is generated by the ITI mitigation circuit 280 from the user data provided by the write data path 460-W. Thus, as shown in FIG. 4, the ESR encoder 420-W and an LDPC encoder 430 in the exemplary write data path 460-W are bypassed by the user data that is provided to the ITI mitigation circuit 280. The ESR encoder 420-W and an LDPC encoder 430 in write data path 460-W are not bypassed by the user data during a write operation, when the user data is encoded to media data before being written to the media.

As show, n in FIG. 4, the ITI mitigation circuit 280 in the read data path 460-R can optionally be bypassed when ITI cancellation is not enabled for a given read operation. Furthermore the ESR encoder 420-R in the read data path 460-R can optionally be bypassed when a media data format is to be recovered.

FIGS. 5-10 illustrate the read channel 250 in various configurations, to implement a number of exemplary modes of operation. In FIGS. 5-10, the active signal path is shown using boldface, dashed arrows. As shown in FIGS. 5-10, and as discussed above, the read channel 250 comprises a Digital Finite Impulse Response filter 285, the ITI mitigation circuit 280, and an iterative decoding block 270.

In addition, as discussed further below in conjunction with FIGS. 5-10, the read channel 250 further comprises multiplexers 505, 515, a Y-AVG post processing block 510, a Y-MEM memory block 520 and a Y-MEM address block 530 for processing the Y-data.

Figure 5A:
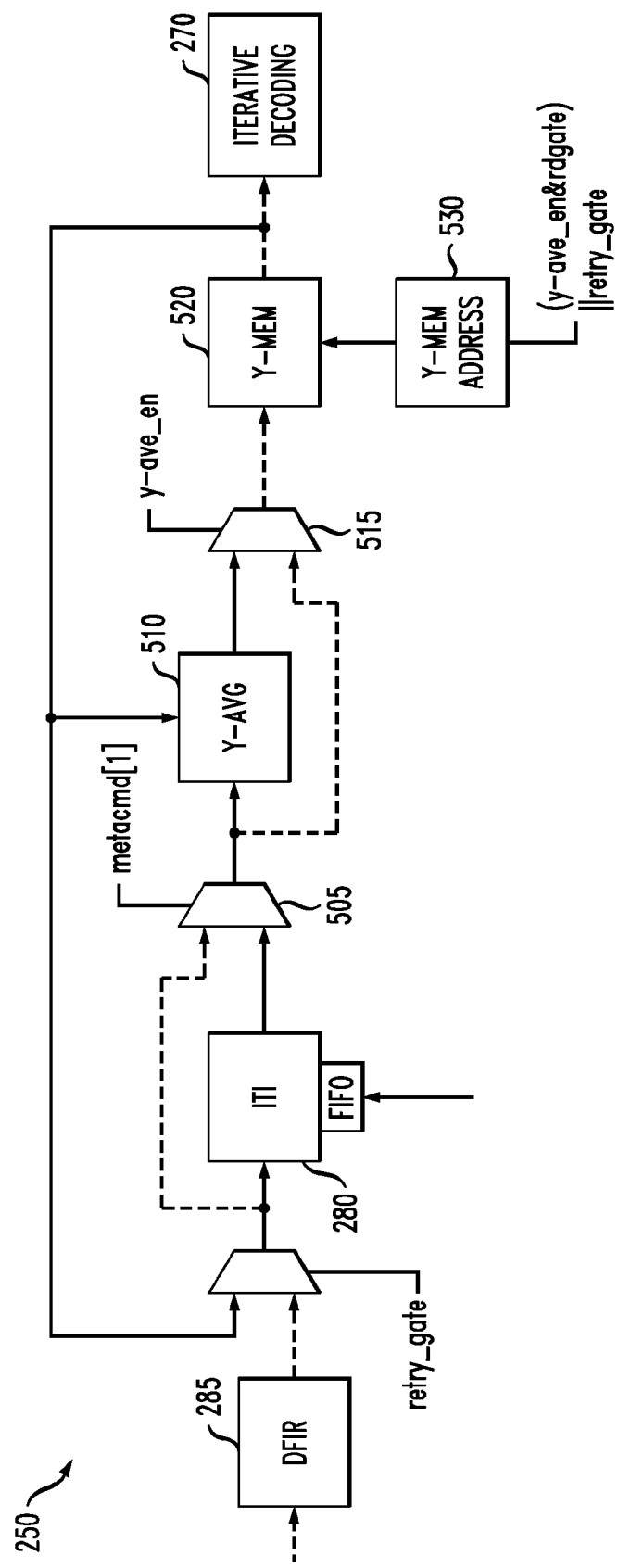
FIGS. 5-10 illustrate the read channel of FIGS. 2-4 in various configurations, to implement a number of exemplary modes of operation, as well as corresponding interface signals for each mode.

FIG. 5A illustrates the read channel 250 in an exemplary non-ITI mode of operation. Generally, the non-ITI mode allows the ITI mitigation to be selectively disabled when not needed (for example, when the track separation is sufficient), and also allows the read channel 250 to be used with legacy systems where ITI mitigation may not be supported. As shown in FIG. 5A, the ITI mitigation circuit 280 is bypassed using the multiplexer 505 and the Y-AVG block 510 is bypassed using the multiplexer 515. Thus, the active signal path for the non-ITI mode comprises the DFIR filter 285, Y-MEM block 520 and the iterative decoding block 270. Generally, the Y-data is stored in the Y-MEM block 520 and then applied to the iterative decoding block 270 for decoding.

Figure 5B:
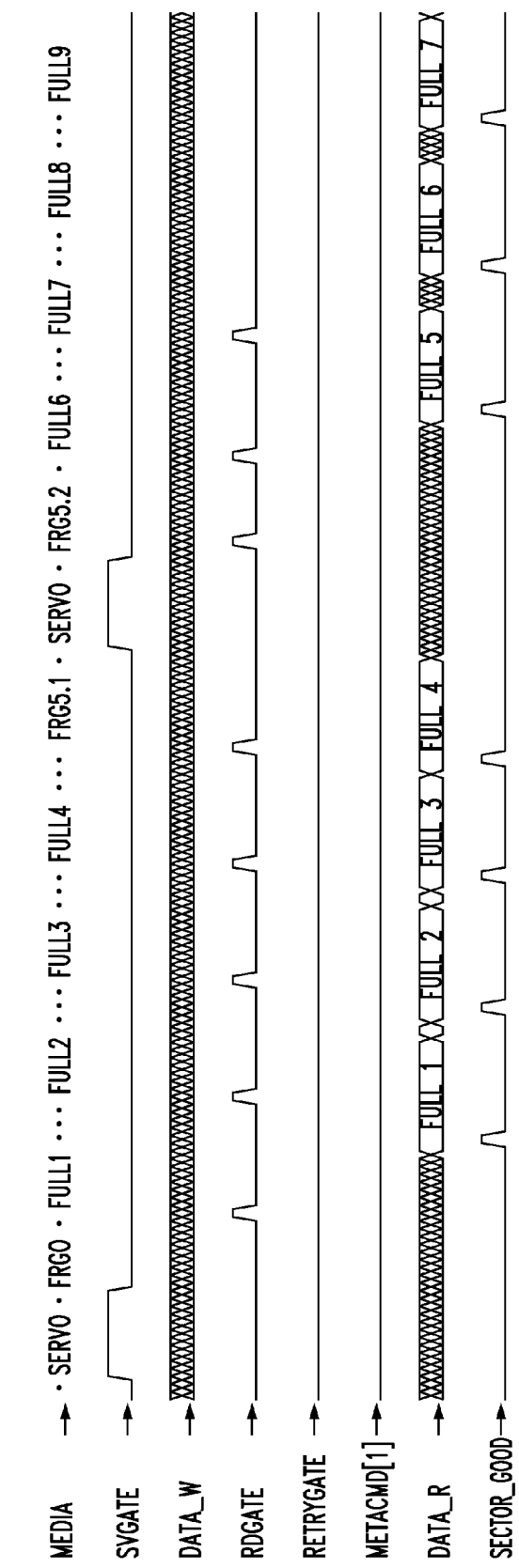

FIG. 5B illustrates a number of interface signals as a function of time for the exemplary non-ITI mode of operation of FIG. 5A. Generally, in the following figures, the MEDIA signal illustrates what is on the media (a servo, a fragment, or a full sector). The term "FRG" in the figures indicates a fragment of a sector, the term "FULL" indicates a complete sector, and the term "SERVO" indicates a split sector (for example, FRG5.1 is a left sector fragment, FRG5.2 is a right sector fragment, and they are split, as indicated by the "SERVO" label). Thus, FRG5.1 and FRG5.2 together make up FULL5 (a full sector is split into two pieces). In addition, two RDGATE pulses are used to read each part and the channel combines and recovers the FULL5 sector. In some figures, the terms "MEDIA (rev 1)" and "MEDIA (rev 2)" indicate that the same sector is read twice (the disk has to go all the way around to get the head over the sector again).

The SVGATE signal indicates the servo gate (just for reference, and is high over any SERVO on the media). The DATA_W signal indicates the write path data (where ITI cancellation data will go into the channel). LEFT# indicates left cancellation data for the sector with the same number, that is it corresponds to adjacent data written in the left track. RIGHT# indicates right cancellation data for the sector with the same number that is it corresponds to adjacent data written in the right track. Referring to FIG. 1, if track 2 is the current track from which data is recovered, tracks 1 and 3 are the adjacent left and right tracks, respectively.

The RDGATE signal corresponds to the read gate and initiates a read from the media. The RDGATE signal is active at the start of each sector and sector fragment. The RETRYG-ATE signal initiates a retry from stored samples (from y-memory). It is noted that while the RETRYGATE signal is illustrated herein in the context of ITI mitigation, the RETRYGATE signal can be employed in other applications as well, as would be apparent to a person of ordinary skill in the art.

As discussed herein, the signal METACMD[1] triggers an ITI mitigation with the read or retry (aligned to RDGATE or RETRYGATE). Since FIG. 5B corresponds to a normal read operation, without mitigation, the METACMD[1] is not active.

The DATA_R signal indicates the recovered sector data (FULL# means the recovered data for the media sector of the same name). In addition, the SECTOR_GOOD signal indicates a good sector has been recovered (when the sector is not good, additional work is performed to recover the sector).

In addition, in one or more of the following figures, the following notation is employed:

avg(data1,data2) indicates a bitwise average of data from two read operations of the same data, where for each bit stored on the media, the corresponding Y-samples data1 and data2 are averaged. In an alternative implementation, the ADC samples are averaged;

decode(data) indicates an LDPC decode operation (data recovery, converted from Y-data to a media or user bits), where Y-data is, for example, represented using 6 bits;

iti(left, data) indicates a removal of ITI caused by the left adjacent track from the main track signal in "data"; and iti(left, right, data) indicates a removal of ITI caused by both the left and right adjacent tracks from the main track signal in "data."

Figure 6A:
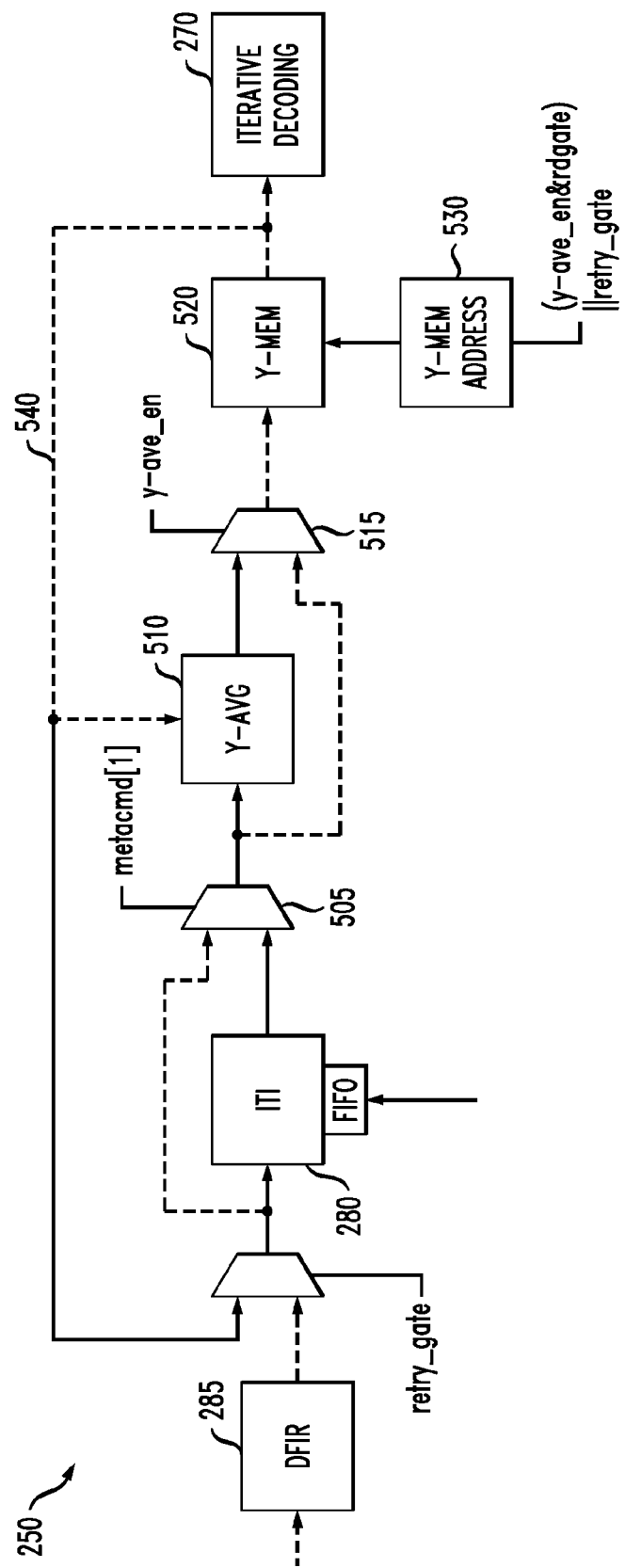

FIG. 6A illustrates the read channel 250 in an exemplary post-processing (non-ITI) mode of operation. As shown in FIG. 6A, the ITI mitigation circuit 280 is bypassed using the multiplexer 505. Thus, the active signal path for the non-ITI mode comprises the DFIR filter 285, the Y-AVG block 510 (selected using the multiplexer 515), Y-MEM block 520 and the iterative decoding block 270. The Y-MEM address block 530 controls the selection of the Y-MEM block 520, in a known manner. Generally, the Y-data for the first read of stored data from a given sector is stored in the Y-MEM block 520 and then all samples for subsequent re-reads of data from the sector are merged, that is averaged by the Y-AVG block 510 with the contents of the Y-MEM block 520 using the feedback path 540. A given sector can be read multiple times, with the contents of the Y-MEM block 520 updated on each iteration, until the stored data from the given sector is successfully read as indicated by a successful decoding operation. The output of the Y-MEM block 520 is also applied to the iterative decoding block 270 for decoding.

Figure 6B:
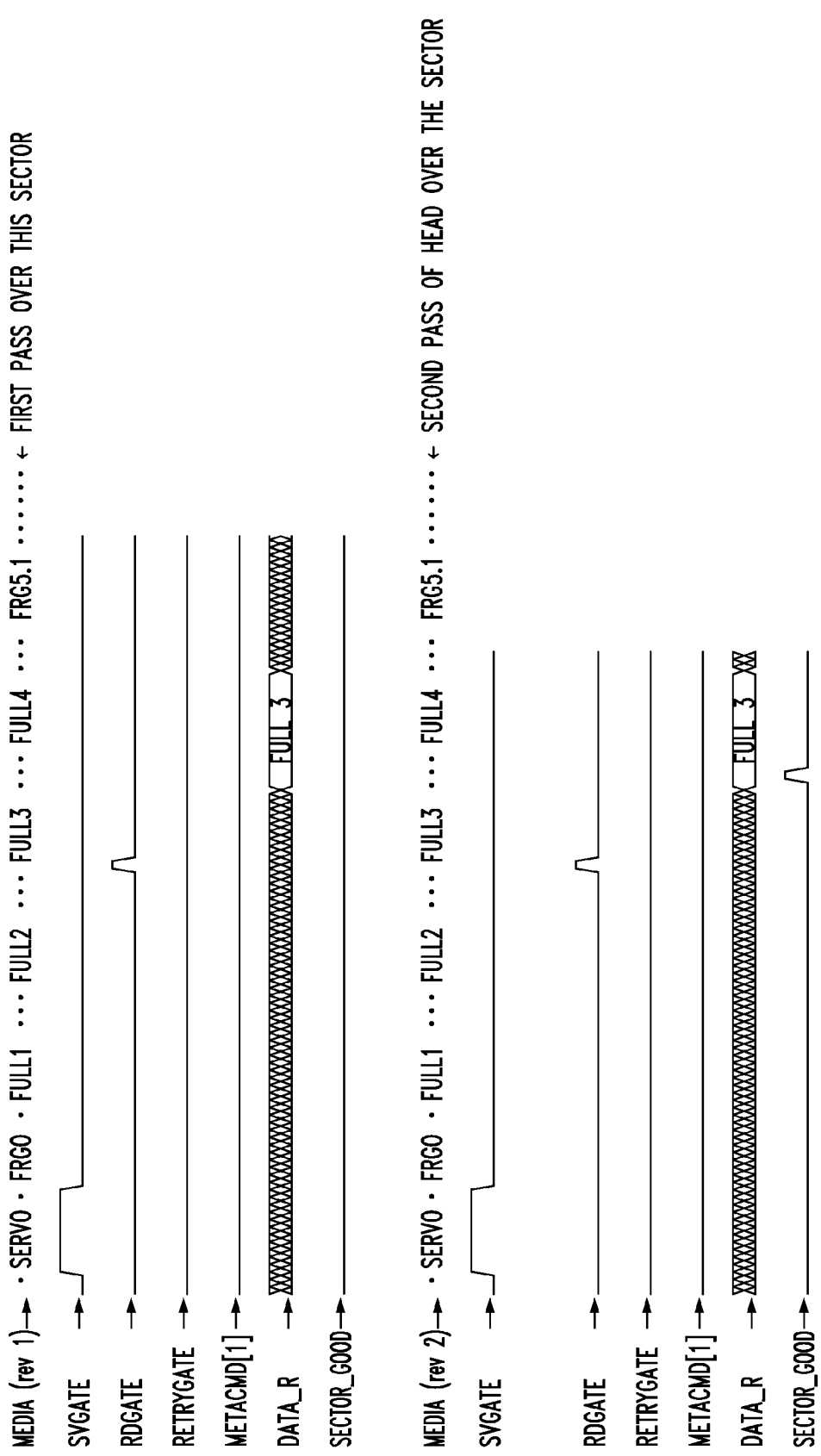

FIG. 6B illustrates a number of interface signals as a function of time for the exemplary post-processing (non-ITI) mode of operation of FIG. 6A. The post-processing performed in the exemplary embodiment comprises an Average Read without ITI mitigation, such as by reading the stored data twice and performing a bitwise average of the data read in the two read operations shown in FIG. 6B. The averaging could be performed for any number of read operations, as would be apparent to a person of ordinary skill in the art. It is noted that ITI mitigation is not needed because the second read and averaging sufficiently reduces the noise so that the data can be recovered. As shown in FIG. 6B, a SECTOR_GOOD signal is not present for the first pass over the third sector, but is present following the second pass over the third sector. It is noted that sector FULL3 is read during the first read and is then passed to the iterative decoder and the decoded sector is passed to the DATA_R bus. Since the sector was not decoded successfully without errors, the SECTOR_GOOD signal is not asserted. On the second revolution, after the second read, the Y-data of the two reads is averaged, and the Y-averaged data is passed to the iterative decoding block, which decodes the sector successfully.

Figure 7A:
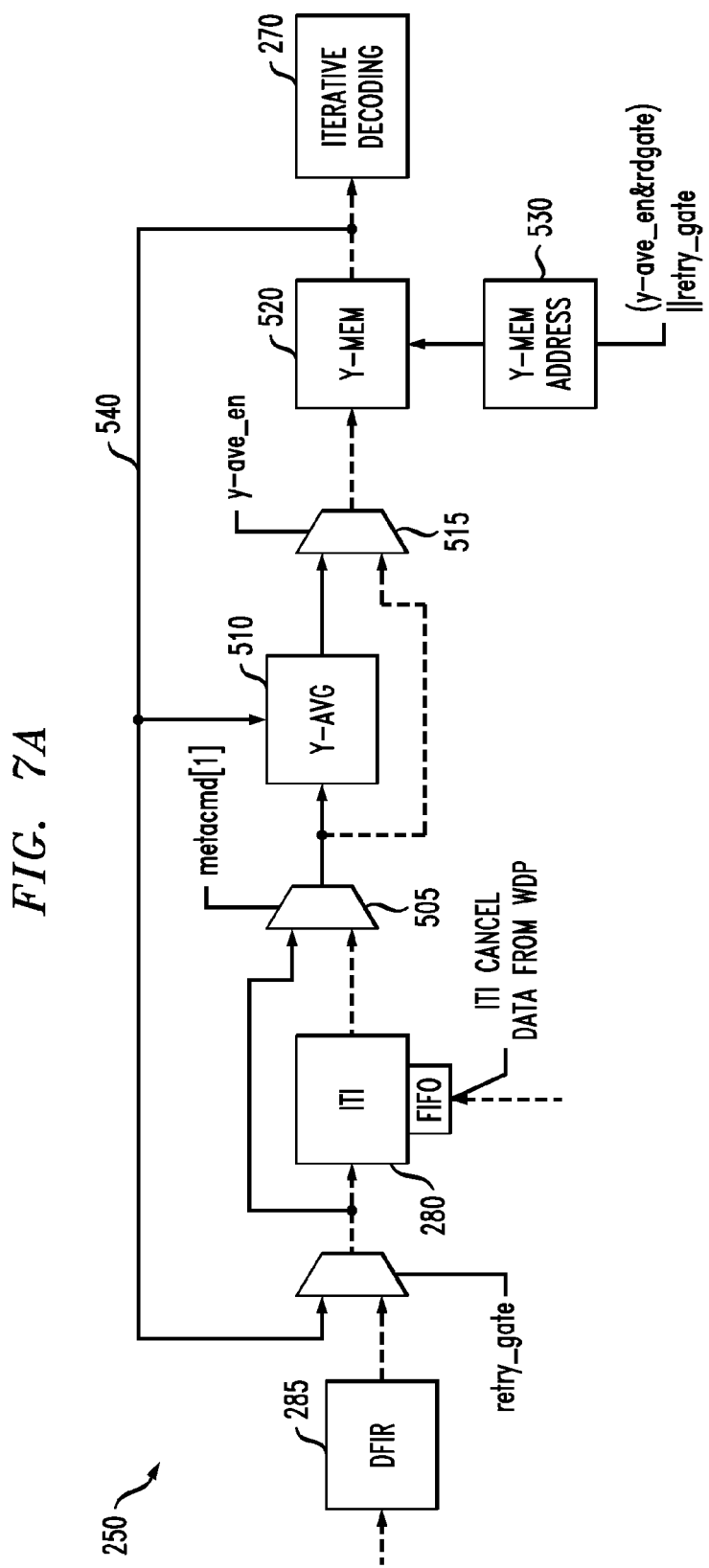

FIG. 7A illustrates the read channel 250 in an exemplary real-time ITI mode of operation. Generally, ITI mitigation is performed at the data rate and can optionally be performed on every sector. In the embodiment of FIG. 7A, ITI mitigation is performed for only one adjacent track to reduce the impact on throughput (for example, as indicated by the exemplary mode control signal or register, ITI_SIDES). The ITI cancellation data is obtained from the write data path 260-W (FIG. 2), as discussed above in conjunction with FIG. 2. As shown in FIG. 7A, the ITI mitigation circuit 280 is placed in the active signal path by the multiplexer 505, and the Y-AVG block 510 is bypassed by the multiplexer 515. Thus, the active signal path for the real-time ITI mode comprises the DFIR filter 285, the ITI mitigation circuit 280, the Y-MEM block 520 and the iterative decoding block 270. Generally, the ITI corrected output of the ITI mitigation circuit 280 is stored in the Y-MEM block 520 and is then applied to the iterative decoding block 270 for decoding.

Figure 7B:
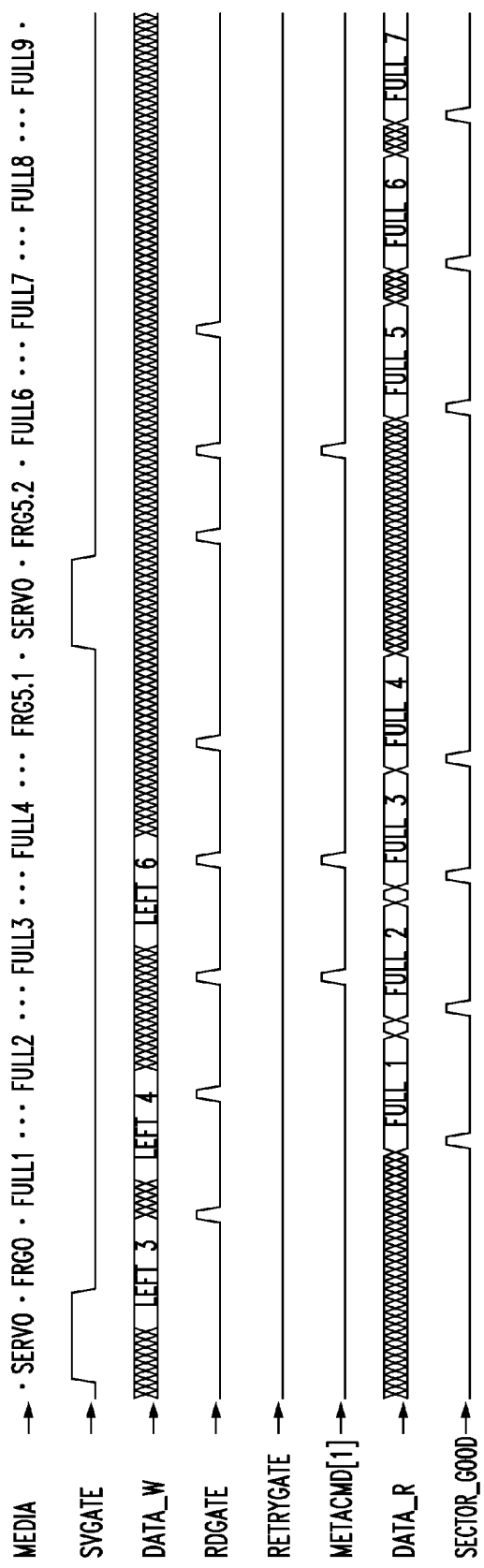

FIG. 7B illustrates a number of interface signals as a function of time for the exemplary real-time ITI mode of operation of FIG. 7A. As discussed herein, the exemplary real-time ITI mode of operation allows ITI mitigation to be selectively enabled by asserting the METACMD[1] signal simultaneously with the RDGATE signal. (ITI_SIDES=0, either for OTF or retry operation).

The RDGATE signal indicates that sectors 1, 2, 3, 4, 5, 6, 7 are read from the media. The DATA_W signal indicates that ITI mitigation will be performed using the left side track for sectors 3, 4 and 6. The METACIVID[1] signal triggers an ITI mitigation with the read or retry (aligned to RDGATE or RETRYGATE). It is noted that sectors 1, 2, 5 and 7 are processed normally, since the METACMD[1] signal is not asserted with the associated RDGATE.

It is noted that a two-sided ITI mode of operation is discussed further below in conjunction with FIGS. 10A through 10C.

Figure 8A:
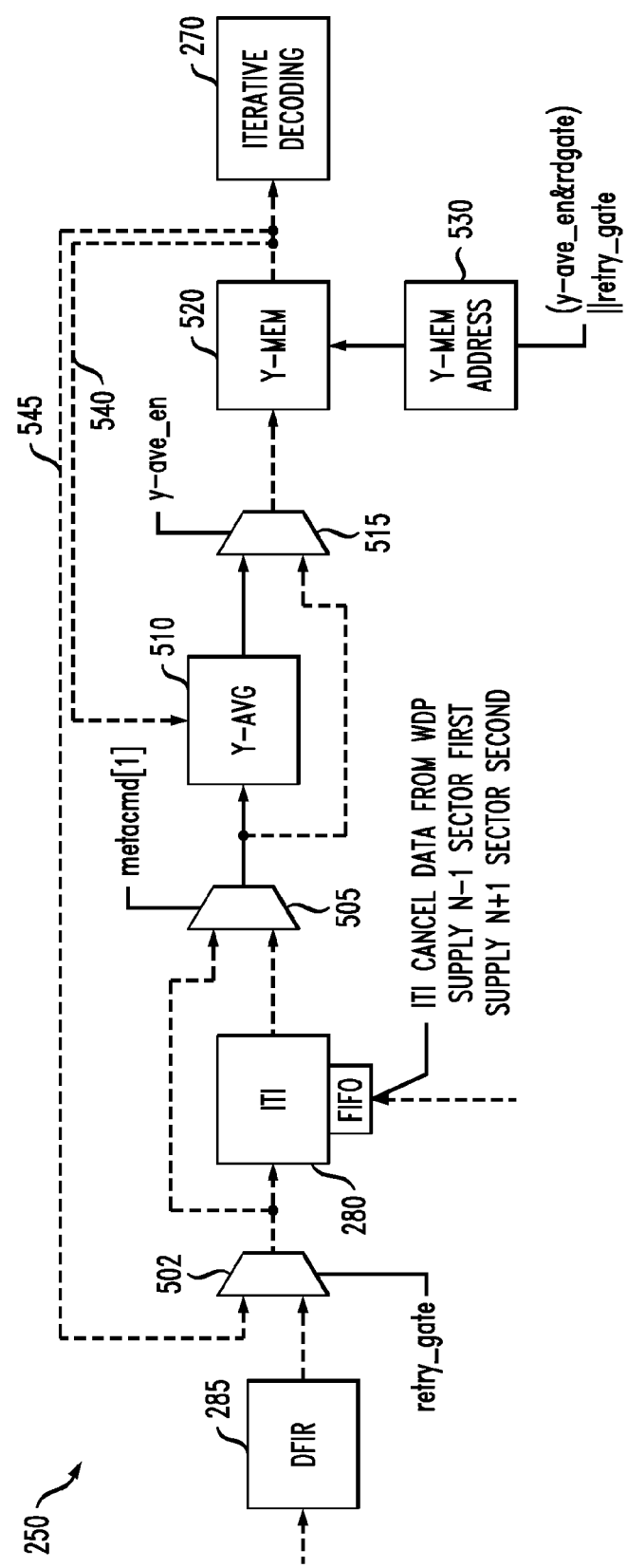

FIG. 8A illustrates the read channel 250 in an exemplary post-processing with ITI Mitigation mode of operation. Generally, the post-processing with ITI Mitigation mode performs ITI mitigation on post-processed Y-data. As shown in FIG. 8A, the ITI mitigation circuit 280 is selectively placed in the active signal path using the multiplexer 505 and the Y-AVG block 510 is placed in the active signal using the multiplexer 515. Thus, the active signal path for the post-processing with ITI Mitigation mode comprises the DFIR filter 285, ITI mitigation circuit 280, the Y-AVG block 510. Y-MEM block 520 and the iterative decoding block 270. The Y-MEM address block 530 controls the selection of the Y-MEM block 520, in a known manner.

Generally, for the first read of a given sector, the ITI mitigation circuit 280 and Y-AVG block 510 are bypassed and the Y-data is stored in the Y-MEM block 520. For subsequent M re-reads of the sector, the new Y samples from the individual reads are merged (i.e., averaged) by the Y-AVG block 510 with the contents of the Y-MEM block 520 using the feedback path 540. A given sector can be read multiple times, with the contents of the Y-MEM block 520 updated on each iteration, until the sector is successfully read. After the M+1-th read operation and completion of the Y-average operation, the Y-MEM block 520 contains the average of the Y-data from the M+1 read operations of the same sector. The output of the Y-MEM block 520 is also applied to the iterative decoding block 270 for decoding.

If the sector is not successfully read after a predefined number (M+1) of re-reads, using post-processed Y-Data, then ITI mitigation can be enabled, to perform ITI mitigation on the post-processed data. The direction to perform ITI mitigation is initiated by the combined signaling of RETRYGATE and METACMD[1] (or by the combined signaling of RETRYGATE and ITI_GATE). In this mode, Y-Data is applied from the Y-MEM block 520 to the ITI mitigation circuit 280 using the feedback path 545, under control of multiplexer 502. The RETRYGATE signal indicates that the Y-data is not obtained by reading a sector from the media, but by reading the Y-MEM block that contains Y samples from a previous read operation. The ITI cancellation data (one sided or two-sided, based on the value of the exemplary ITI_SIDES control word) is obtained from the write data path 260-W (FIG. 2), as discussed above in conjunction with FIG. 2. In addition, the Y-AVG block 510 block is now bypassed using the multiplexer 515, so that the post-processed, then cancelled data can be stored in the Y-MEM block 520 prior to decoding by the iterative decoding block 270.

In a further variation, the number of average re-read operations can be dynamically determined (or terminated upon the occurrence of a predefined condition). Upon each averaging operation, as the averaged data is pushed to the decoder, the data is decoded and one or more metrics on the quality of decoding are generated. For example, one exemplary quality metric can include a number of bit errors. In one exemplary implementation, the averaging procedure can be continued until the number of bit errors decreases. If the number of bit errors plateaus (i.e., additional averaging may no longer help), then ITI mitigation can be performed. Similarly, the subsequent use of ITI mitigation can also be dynamically determined. As the ITI mitigation operations are performed, the data and metrics are computed and sent to the controller which can terminate immediately once recovery has been achieved (potentially using the same example discussed above relating to bit errors). In this case, the signal ITI_SIDES is adjusted to perform only one-sided cancellation and each side is performed one at a time with the metrics/data analyzed after each step until recovery is successful.

Figure 8B:
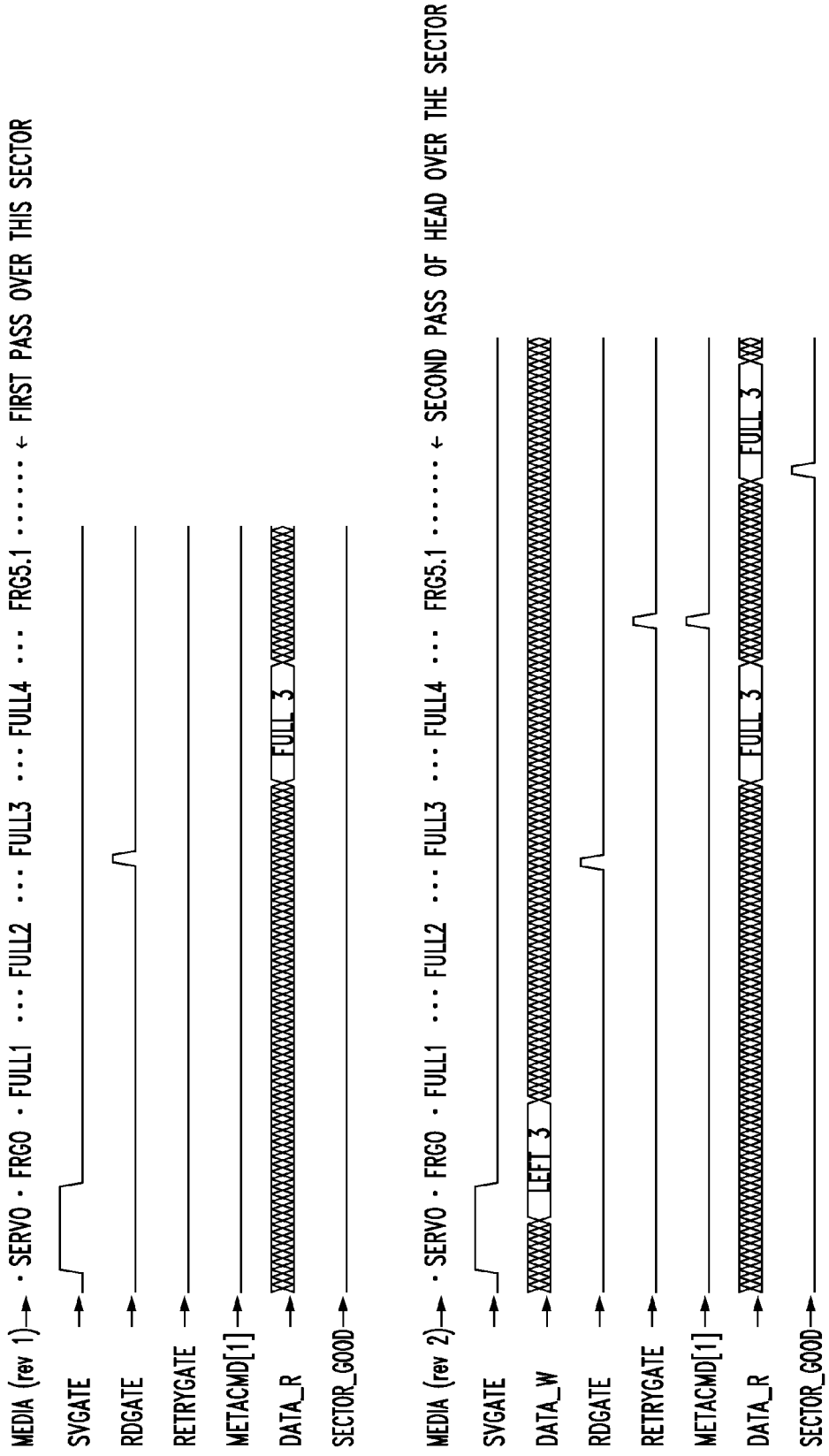

FIG. 8B illustrates a number of interface signals as a function of time for the exemplary post-processing with single-sided ITI Mitigation mode of operation of FIG. 8A (ITI_SIDES=0). The post-processing performed in the exemplary embodiment comprises an Average Read with single-sided ITI mitigation, such as an average of two reads shown in FIG. 8B. The averaging could be performed for any number of read operations, as would be apparent to a person of ordinary skill in the art. It is noted that the reading can be stopped if the first or second read operation has a SECTOR_GOOD signal. Relating to the DATA_R signal, it is further noted that the first "FULL3" in FIG. 8B comprises a decode(avg(read1, read2)) and the second "FULL3" comprises a decode(iti(left,avg (read1, read2))). It is noted that sector FULL3 is read during the first read and is then passed to the iterative decoder, and the decoded sector is passed to the DATA_R bus. Since the sector was not decoded successfully without errors, the SECTOR_GOOD signal is not asserted. On the second revolution, after the second read, the Y-data of the two reads is averaged, and the Y-averaged data is passed to the iterative decoding block, and the decoded sector is passed to the DATA_R bus. Since the sector was not decoded successfully without errors, the SECTOR_GOOD signal is not asserted. Then, the RETRYGATE and METACMD[1] signals initiate the ITI cancellation in accordance with the present invention to process the Y-averaged data and mitigate the ITI using the cancellation data for the left track (LEFT3) that is adjacent to sector 3 in the main track. This cancellation data LEFT3 was provided earlier on the write data path using the DATA_W bus. The result is passed to the iterative decoding block, which generates the decoded sector. The decoded sector is passed to the DATA_R bus. Since this sector was decoded successfully without errors, the SECTOR_GOOD signal is asserted.

FIG. 8C illustrates a number of interface signals as a function of time for the exemplary post-processing with automatic two-sided ITI Mitigation mode of operation of FIG. 8A (ITI_SIDES=1). The post-processing performed in the exemplary embodiment comprises an Average Read with automatic two-sided ITI mitigation, such as an average of two reads shown in FIG. 8C. The averaging could be performed for any number of read operations, as would be apparent to a person of ordinary skill in the art. It is noted that the reading can be stopped if the first or second read operation has a SECTOR_GOOD signal, or when the first ITI RETRY has a SECTOR_GOOD signal. Relating to the DATA_R signal, it is further noted that the first "FULL3" in FIG. 8C comprises a decode(avg(read1, read2)) and the second "FULL3" comprises a decode(iti(left-sight,avg(read1, read2))). It is noted that sector FULL3 is read during the first read and is then passed to the iterative decoder. The decoded sector is passed to the DATA_R bus. Since the sector was not decoded successfully without errors, the SECTOR_GOOD signal is not asserted. On the second revolution, after the second read, the Y-data of the two reads is averaged, and the Y-averaged data is passed to the iterative decoding block. The decoded sector is passed to the DATA_R bus. Since the sector was not decoded successfully without errors, the SECTOR_GOOD signal is not asserted. Then, the RETRYGATE and METACMD[1] signals (with ITI_Sides=1) initiate the automatic two-sided ITI Mitigation mode of operation to process the Y-averaged data and mitigate the ITI using cancellation data for both the left track (LEFT3) and right track (RIGHT3) that are adjacent to sector 3 in the main track. This cancellation data LEFT3 and RIGHT3 was provided earlier on the write data path using the DATA_W bus. The combined result is passed to the iterative decoding block, which generates the decoded sector. The decoded sector is passed to the DATA_R bus. Since this sector was decoded successfully without errors, the SECTOR_GOOD signal is asserted.

Figure 8D:
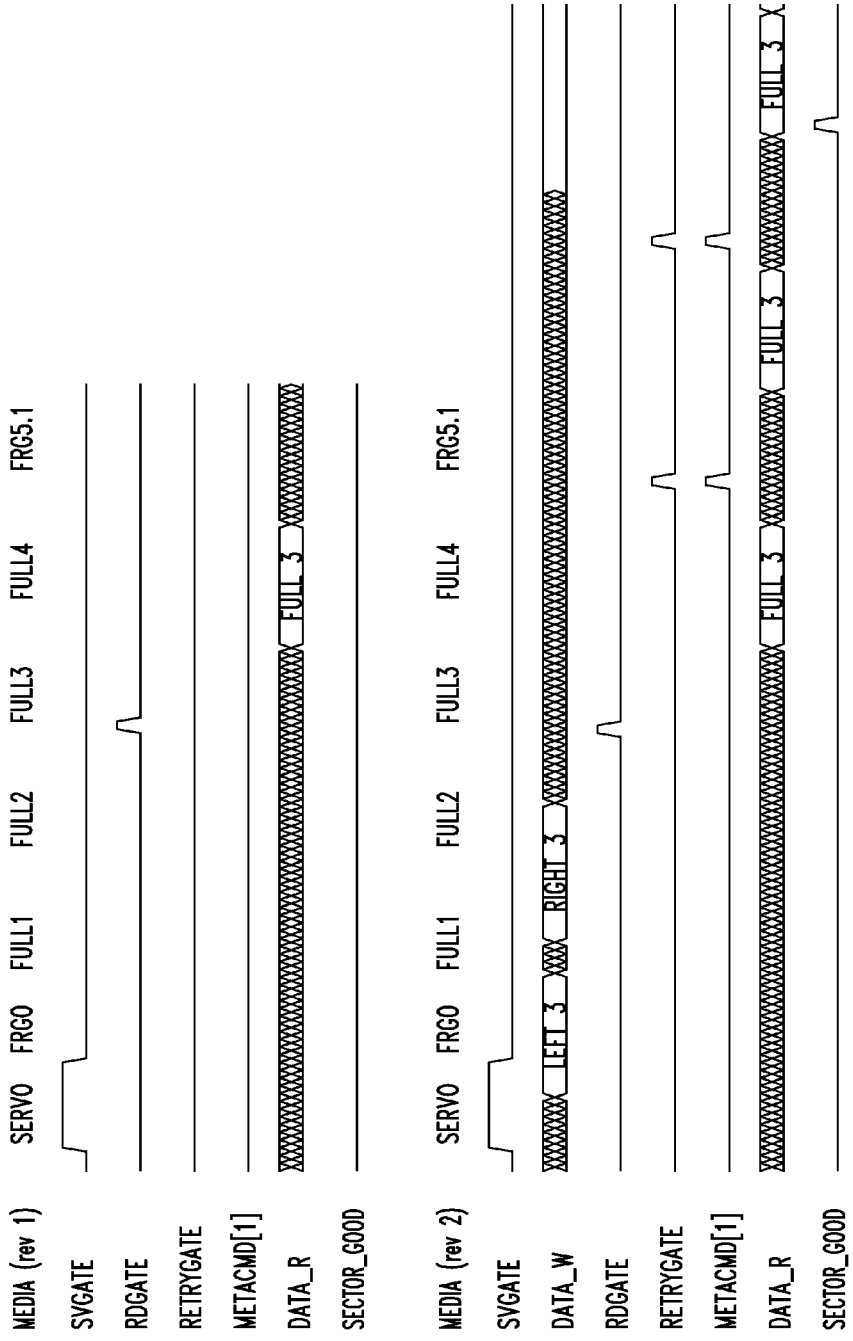

FIG. 8D illustrates a number of interface signals as a function of time for the exemplary post-processing with two-sided ITI Mitigation mode of operation of FIG. 8A, where the ITI mitigation is performed one side at a time (ITI_SIDES=0). The post-processing performed in the exemplary embodiment comprises an Average Read with two-sided ITI mitigation (one side at a time), such as an average of two reads shown in FIG. 8D. The averaging could again be performed for any number of read operations, as would be apparent to a person of ordinary skill in the art. It is noted that the reading can be stopped whenever a SECTOR_GOOD signal is detected. Relating to the DATA_R signal, it is further noted that the first "FULL3" in the bottom half of FIG. 8D comprises a decode(read1), the second FULL3 comprises a decode(avg(read1, read2)), the third "FULL3" comprises a decode(iti(left, avg(read1, read2))) and the fourth "FULL3" comprises a decode(iti(left,right,avg(read1, read2))). It is noted that sector FULL3 is read during the first read and is then passed to the iterative decoder. The decoded sector is passed to the DATA_R bus. Since the sector was not decoded successfully without errors, the SECTOR_GOOD signal is not asserted. On the second revolution, after the second read, the Y-data of the two reads is averaged, and the Y-averaged data is passed to the iterative decoding block. The decoded sector is passed to the DATA_R bus. Since the sector was not decoded successfully without errors, the SECTOR_GOOD signal is not asserted. Then, the first RETRYGATE and METACMD[1] signals (with ITI_Sides=0) initiate the two-sided ITI Mitigation mode of operation (with one side at a time) to process the Y-averaged data and mitigate the ITI using cancellation data for the left track (LEFT3) that is adjacent to sector 3 in the main track. This cancellation data LEFT3 was provided earlier on the write data path using the DATA_W bus. The result from the ITI cancellation is passed to the iterative decoding block, which generates the decoded sector. The decoded sector is passed to the DATA_R bus. Since this sector was not decoded successfully without errors, the SECTOR_GOOD signal is not asserted. The second set of RETRYGATE and METACMD[1] signals (with ITI_Sides=0) initiate the ITI Mitigation using the cancellation data for the right track (RIGHT3) that is adjacent to sector 3 in the main track. This cancellation data RIGHT3 was provided earlier on the write data path using the DATA_W bus. The combined result is then passed to the iterative decoding block, which generates the decoded sector. The decoded sector is passed to the DATA_R bus. Since this sector was decoded successfully without errors, the SECTOR_GOOD signal is asserted.

Figure 9A:
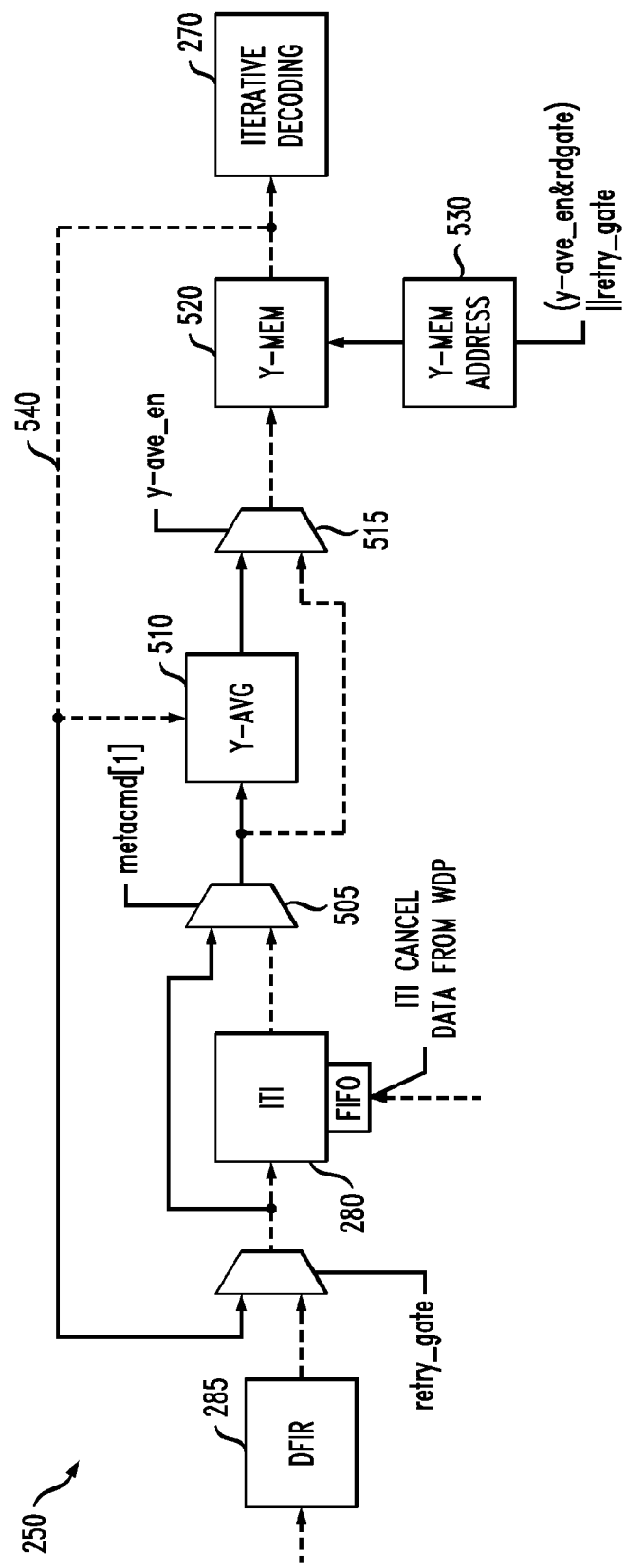

FIG. 9A illustrates the read channel 250 in an exemplary ITI Mitigation with a post-processing mode of operation. In this configuration, the ITI Mitigation with post-processing mode performs ITI mitigation first and then post-processing of the Y-data. As shown in FIG. 9A, the ITI mitigation circuit 280 is selectively placed in the active signal path using the multiplexer 505 and the Y-AVG block 510 is placed in the active signal using the multiplexer 515. Thus, the active signal path for the ITI Mitigation with post-processing mode comprises the DFIR filter 285, ITI mitigation circuit 280, the Y-AVG block 510, Y-MEM block 520 and the iterative decoding block 270. The Y-MEM address block 530 controls the selection of the Y-MEM block 520, in a known manner.

In the embodiment of FIG. 9A, ITI mitigation is performed for either adjacent track or both adjacent tracks, or not at all, for a given read operation, for example, as indicated by the exemplary mode control signal or register. ITI_SIDES, and METACMD[1] (to bypass ITI mitigation, i.e. "not at all"). The ITI cancellation data is obtained from the write data path 260-W (FIG. 2), as discussed above in conjunction with FIG. 2. As shown in FIG. 9A, for the first set of samples, the ITI mitigation circuit 280 is placed in the active signal path by the multiplexer 505, and the Y-AVG block 510 is bypassed by the multiplexer 515, and the ITI corrected data is sent to the Y-MEM block 520 and the iterative decoding block 270.

In addition, all remaining ITI corrected samples are merged (i.e., averaged) by the Y-AVG block 510 with the contents of the Y-MEM block 520 using the feedback path 540. A given sector can be read multiple times, with the contents of the Y-MEM block 520 updated on each iteration, until the sector is successfully read. The output of the Y-MEM block 520 is also applied to the iterative decoding block 270 for decoding.

Figure 9B:
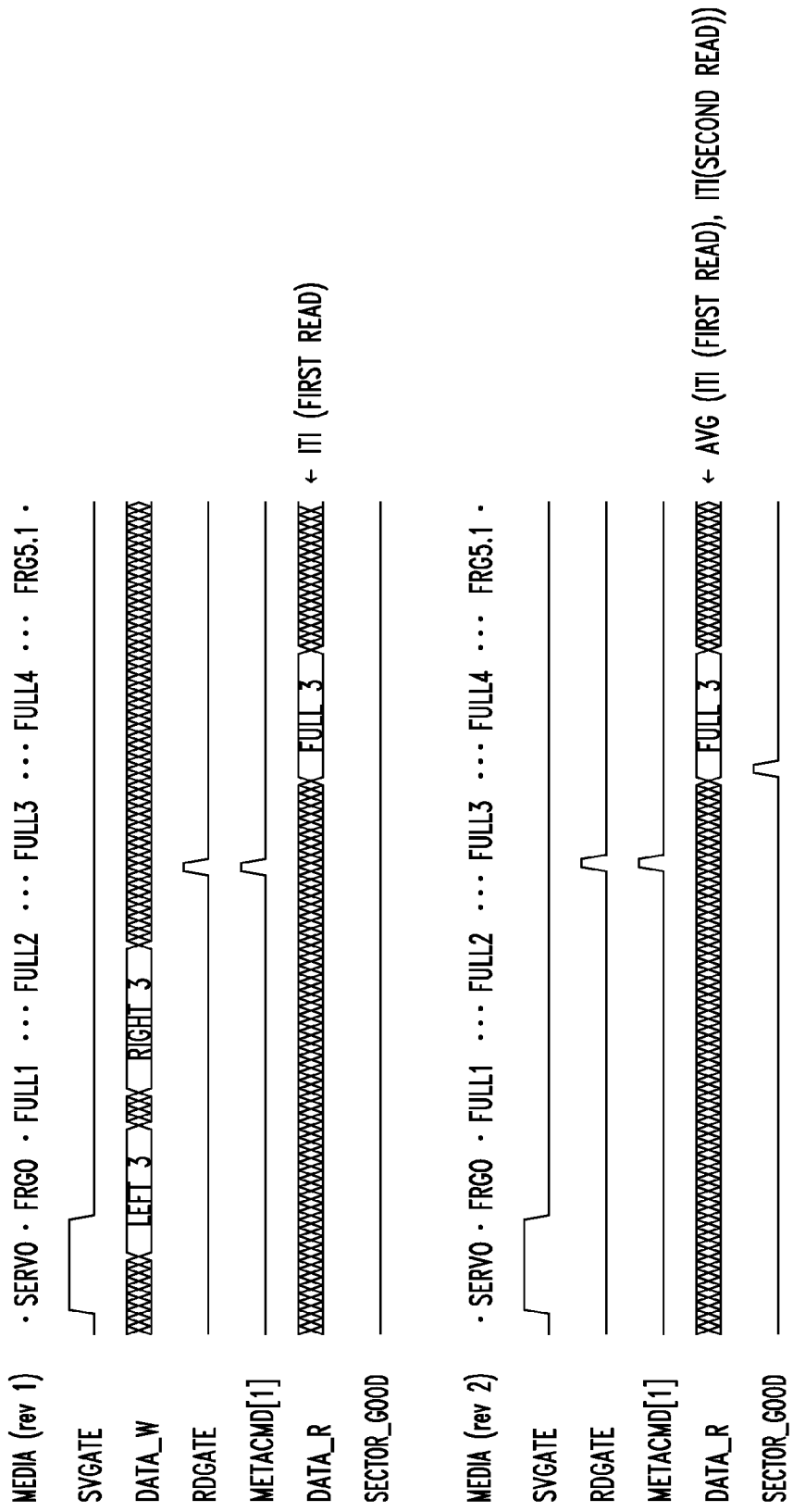

FIG. 9B illustrates a number of interface signals as a function of time for the exemplary ITI Mitigation with a post-processing mode of operation of FIG. 9A. The post-processing performed in the exemplary embodiment comprises an Average of ITI mitigated data. The averaging could again be performed for any number of read operations, as would be apparent to a person of ordinary skill in the art. Generally, the process comprises reading the media twice. For each media read, the ITI is mitigated and the result is averaged with the previously computed/stored results. For example, for an average over two read operations, the process comprises reading a target sector from the media, performing ITI mitigation on the read data (e.g. ITI from left adjacent track is mitigated), storing the result (i.e., store an average of one set of samples), reading the same target sector from the media 295 again, performing ITI mitigation on the read data (e.g., ITI from right adjacent track is mitigated), and averaging the second ITI mitigated data with the stored data (resulting in an average of ITI cancelled data). This can be expressed as avg(iti(first_read), iti(second_read))=(iti(read1)+iti(read2))/2.0). It is noted that during the two reads, ITI from the same adjacent track could have been mitigated in an alternative mode of operation.

It is noted that while the exemplary ITI mitigation with a post-processing mode of operation of FIGS. 9A and 9B is illustrated for one-sided ITI mitigation, N-sided ITI mitigation is possible, as discussed herein and as would be apparent to a person of ordinary skill in the art.

Figure 10A:
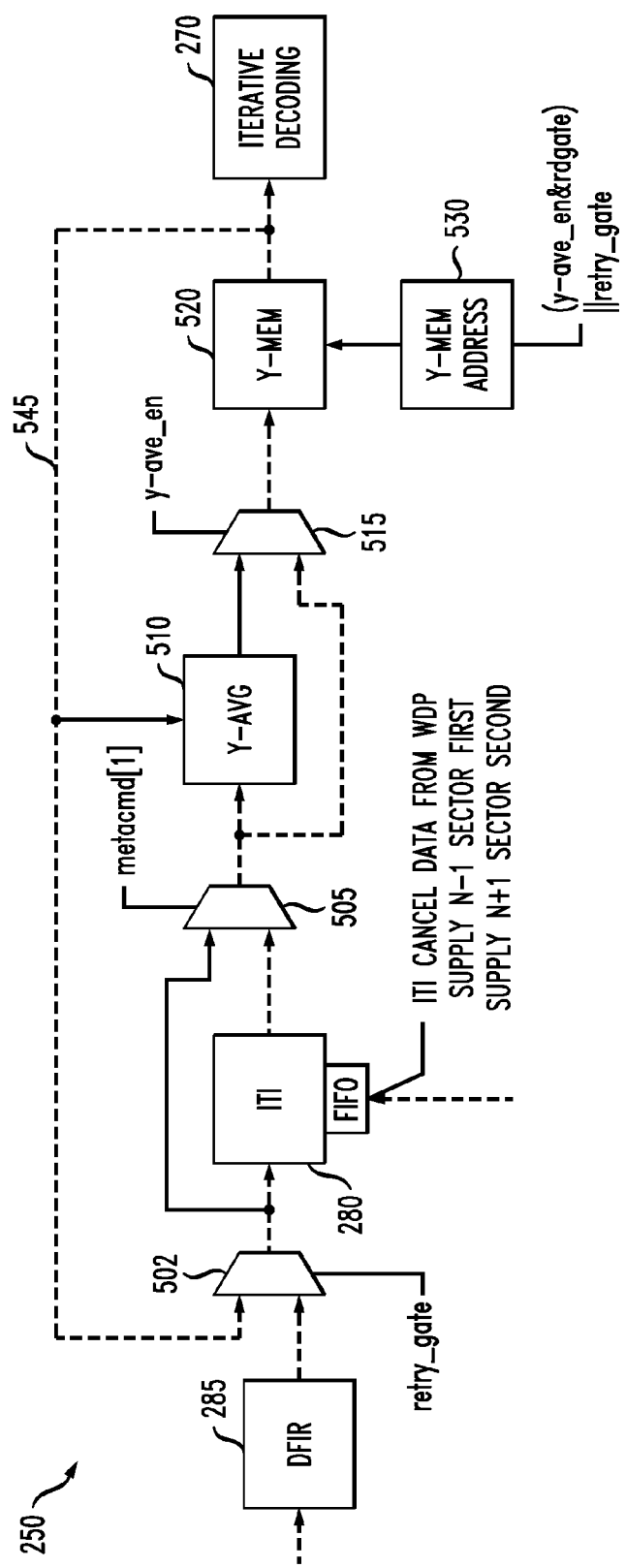

FIG. 10A illustrates the read channel 250 in an exemplary two-sided ITI mode of operation. The ITI cancellation data is obtained from the write data path 260-W (FIG. 2), as discussed above in conjunction with FIG. 2. Initially, one-sided ITI mitigation is performed (i.e., ITI mitigation for one adjacent (rack), in a similar manner to FIG. 7A. As shown in FIG. 10A, the ITI mitigation circuit 280 is placed in the active signal path by the multiplexer 505, and the Y-AVG block 510 is bypassed by the multiplexer 515. Thus, the active signal path for the real-time ITI mode comprises the DFIR filter 285, the ITI mitigation circuit 280, the Y-MEM block 520 and the iterative decoding block 270. Generally, the ITI corrected output of the ITI mitigation circuit 280 is stored in the Y-MEM block 520 and is then applied to the iterative decoding block 270 for decoding.

To perform ITI mitigation for the second adjacent track, the Y-data from the Y' MEM block 520 is applied to the ITI mitigation block 280, using the feedback path 545 and appropriate selection by multiplexer 502, either under control of a retrygate signal or automatically. In this manner, data is passed to the decoder 270 only once, as one read of the media produces one sector of data (regardless of the number of sides). Thus, two events (one media read and one retry) produce two sectors of data when controlled by the retrygate signal or one event (media read) produces one sector of data (in the automatic mode). The ITI cancellation data is obtained for the other adjacent track from the write data path 260-W (FIG. 2), as discussed above in conjunction with FIG. 2. The ITI mitigation circuit 280 remains in the active signal path by the multiplexer 505, and the Y-AVG block 510 is again bypassed by the multiplexer 515. Thus, the active signal path for the real-time ITI mode comprises the DFIR filter 285, the ITI mitigation circuit 280, the Y-MEM block 520 and the iterative decoding block 270. Generally, the ITI corrected output of the ITI mitigation circuit 280 is stored in the Y-MEM block 520 and is then applied to the iterative decoding block 270 for decoding. In this manner, the two-sided ITI mode of operation allows ITI mitigation for both adjacent tracks with only a single read of the magnetic media.

Figure 10B:
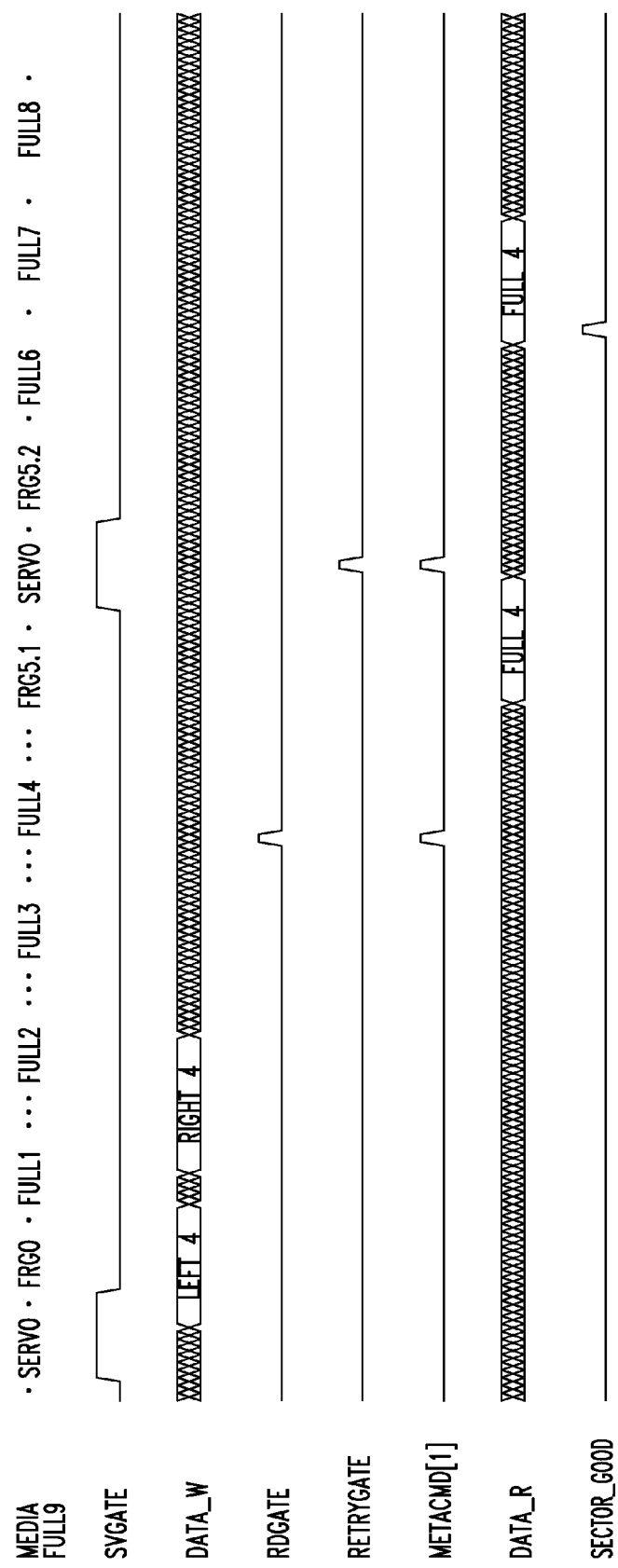

FIG. 10B illustrates a number of interface signals as a function of time for the exemplary two-sided ITI mode of operation of FIG. 10A, where two single-sided ITI cancellations are sequentially triggered. The exemplary two-sided ITI mode of operation allows ITI mitigation to be performed for two adjacent tracks(ITI_SIDES=0, RETRY operation only). In FIG. 10B, for the exemplary two-sided ITI mode, ITI mitigation is performed for one side at a time. Thus, ITI_SIDES=0. The exemplary DATA_W signal indicates that ITI mitigation will be performed for sector 4 using the left and right side tracks. The METACMD[1] signal triggers an ITI mitigation with the retry (aligned to RDGATE or RETRYGATE). Since FIG. 10B corresponds to a read operation with ITI mitigation, the METACMD[1] is active when aligned with the RDGATE signal for sector 4 and the RETRY signal. It is noted that the first FULL4 on DATA_R is "not good" so second side mitigation is attempted, leading to a SECTOR_GOOD signal. It is noted that the first "FULL4" in FIG. 10B comprises a decode(iti(left, read1)) and the second "FULL4" comprises a decode(iti(left, right, read1)) [ITI_SIDES=0].

Figure 10C:
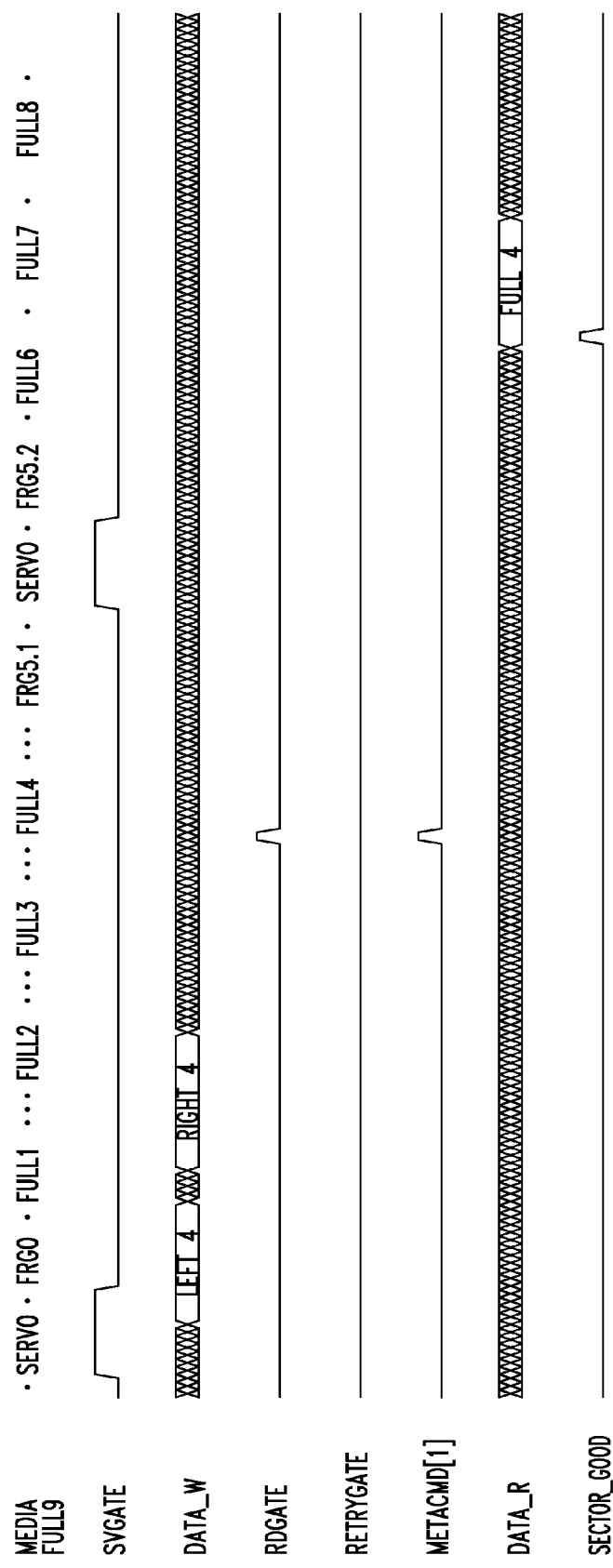

FIG. 10C illustrates a number of interface signals as a function of time for the exemplary automatic two-sided ITI mode of operation of FIG. 10A. The exemplary automatic two-sided ITI mode of operation allows ITI mitigation to be performed for two adjacent tracks. In FIG. 10C, for the exemplary automatic two-sided ITI mode, ITI mitigation is performed for two adjacent tracks at a time. Thus, ITI_SIDES=1, RETRY mode only. The exemplary DATA_W signal indicates that ITI mitigation will be performed for sector 4 using the left and right side tracks. The METACMD[1] signal triggers an ITI mitigation with the read (aligned to RDGATE). Since FIG. 10C corresponds to a read operation with ITI mitigation, the METACMD[1] is active when aligned with the RDGATE signal for sector 4. It is noted that "FULL4" in FIG. 10C comprises a decode(iti(left, right, read1)) [ITI_SIDES=1].

Mitigation Architecture and Implementation

The signal at the output of the DFIR filter 285 (e.g., FIGS. 2-4) includes both intersymbol interference and inter-track interference. The ITI is mitigated in accordance with the present invention using hard decisions for the data stored in the adjacent tracks. For single-sided ITI mitigation, data for either adjacent track is used, while for two-sided ITI mitigation, data for both adjacent tracks are used.

The data for the adjacent tracks 110-1 and 110-3 (FIG. 1) was obtained by reading the adjacent tracks 110-1 and 110-3 in previous read operations, and stored, for example, in the DRAM 220 (FIG. 2). The adjacent track data is used to estimate and mitigate the ITI included in the signal at the output of the DFIR 285.

The ITI-mitigated signal is then optionally passed through a noise-predictive maximum likelihood (NPML) detector (not shown) and decoder 270 to recover the data in track N. In order to facilitate ITI mitigation, it is expected that SMR hard disck drives (FIDDs) will use an aligned sector data format, where sectors in adjacent tracks are aligned with respect to position within the tracks. Conventional non-shingled HDDs typically use a non-aligned sector data format, where sectors in adjacent tracks are usually not aligned. The advantage of the aligned sector data format is that to mitigate ITI for a sector in track N, only the data for one adjacent sector in tracks N−1 and N+1 need to be considered. In the case of nonaligned sector data formats, the data for two adjacent sectors in each of tracks N−1 and N+1 and need to be considered.

Even with an aligned sector data format, sectors in adjacent tracks can be offset by up to several bit periods due to non-idealities in the write process. Also, disk frequency variations while writing the data in the different tracks can cause a slight frequency offset between the data written to adjacent tracks. This frequency offset can cause a phase drift of the N−1 and N+1 ITI responses in the signal read from track N. For good bit-error-rate (BER) performance, the ITI mitigation algorithm should account for both the phase difference between adjacent sectors due to the non-ideal write process and the phase drift of the ITI responses due to the frequency offset between adjacent tracks.

SMR hard disk drives will likely employ M mitigation for offline error recovery. Whenever decoding of a target sector in track N without ITI mitigation fails during a normal read operation, the HDD will read the sectors in the adjacent tracks (or during a retry operation, reread the failing sector in track N) and restart decoding of this sector with ITI mitigation. Therefore, single-sided ITI mitigation will incur one extra revolution and two-sided ITI mitigation will incur two extra revolutions to recover the hard decisions for the adjacent tracks, which are used for ITI mitigation as described herein.

The hard decisions for the sidetracks N−1 and N+1 can be stored, for example, in DRAM 220 (FIG. 2). For offline single-sector ITI mitigation, only one sector for tracks N−1 and N+1 (in total, one sector for single-sided and two sectors for two-sided ITI mitigation) need to be stored in the DRAM 220. Compared to conventional HDDs, an additional data path between the HDD controller 210 and read channel 250 is required to transfer data corresponding to tracks N−1 and N+1 for ITI mitigation. In the disclosed embodiments, the write data path is used to transfer cancellation data corresponding to tracks N−1 and N+1 for ITI mitigation.

On-the-fly (OTF) ITI mitigation during a normal read operation requires sequential reading of tracks, since random reading of tracks would require additional revolutions to read the adjacent track data. In a single-sided OTF ITI mitigation with sequential reading, tracks 1, 2, 3, etc. are read in sequence for ITI mitigation, where ITI is mitigated from track N using the stored hard decisions from the previously read track. For single-sided OTF ITI mitigation, the tracks are read in sequence in reverse order, where ITI is mitigated from track N using the stored hard decision from the previously read track. Single-sided OTF ITI mitigation, therefore, requires that an entire track worth of hard decisions is stored in the DRAM 220.

OTF ITI mitigation also requires additional bandwidth in the DRAM memory of a HDD, since two simultaneous data streams from the read channel 250 to the controller 210 need to be supported: the transfer of decoded sectors from the read channel 250 to the controller 210 and the transfer of data for sectors in adjacent tracks from the controller 210 to the read channel 250.

It is noted that ITI mitigation using additional tracks, such as triple-sided M mitigation can be performed in accordance with the present invention, as would be apparent to a person of ordinary skill in the art.

As previously indicated, the arrangements of magnetic recording systems and read channels, as described herein, provide a number of advantages relative to conventional arrangements. Again, it should be emphasized that the above-described embodiments of the invention are intended to be illustrative only. In general, the exemplary magnetic recording systems can be modified, as would be apparent to a person of ordinary skill in the art, to incorporate ITI mitigation schemes that provide ITI mitigation data using the write data path. In addition, the disclosed techniques for ITI mitigation can be employed in any magnetic recording system, such as a virtual storage system/storage virtualization system, such as a Redundant Array of Independent Disks (RAID) system.

The interface and dataflow mechanisms described herein support additional operating modes and configurations without modification, as would be apparent to a person of ordinary skill in the art. For example, the disclosed ITI mitigation techniques may be implemented in conventional drives with multiple side-tracks that interfere as shown (a potential use for N-sided mitigation); shingled or conventional drives with aligned or misaligned sectors (a potential use of known data); and conventional drives that have unintentional squeezing (such that the drives needs ITI recovery despite it not being a shingled drive). Generally, misaligned sectors occur when the data of adjacent sectors are not aligned. For example, referring to FIG. 1, if the center track 110-2 did not align with one or more of the adjacent tracks 110-1, 110-3, the tracks are said to be misaligned. In the event of misaligned tracks, the present invention permits ITI mitigation of the sector a given track using the portions of the adjacent track that are aligned to the sector of the given track, regardless of the sectors that the aligned portions of the adjacent track belong to.

While exemplary embodiments of the present invention have been described with respect to digital logic blocks, as would be apparent to one skilled in the art, various functions may be implemented in the digital domain as processing steps in a software program, in hardware by circuit elements or state machines, or in combination of both software and hardware. Such software may be employed in, for example, a digital signal processor, application specific integrated circuit, micro-controller, or general-purpose computer. Such hardware and software may be embodied within circuits implemented within an integrated circuit.

In an integrated circuit implementation of the invention, multiple integrated circuit dies are typically formed in a repeated pattern on a surface of a wafer. Each such die may include a device as described herein, and may include other structures or circuits. The dies are cut or diced from the wafer, then packaged as integrated circuits. One skilled in the art would know how to dice wafers and package dies to produce packaged integrated circuits. Integrated circuits so manufactured are considered part of this invention.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

It is to be understood that the embodiments and variations shown and described herein are merely illustrative of the principles of this invention and that various modifications may be implemented by those skilled in the art without departing from the scope and spirit of the invention.

We claim:

1. A method for mitigation of inter-track interference (ITI) in a magnetic recording system, comprising:
    obtaining inter-track interference cancellation data for one or more adjacent tracks that are adjacent to a given track; and
    providing said inter-track interference cancellation data to an inter-track interference mitigation circuit using at least a portion of a write data path in said magnetic recording system.

2. The method of claim 1, wherein said inter-track interference cancellation data is obtained from a memory that is external to said write data path.

3. The method of claim 1, wherein said inter-track interference cancellation data comprises one or more of user data, media data, analog-to-digital converter (ADC) data and Y-data comprising equalized ADC samples.

4. The method of claim 1, wherein said write data path operates substantially simultaneously with a read data path performing said read operation.

5. The method of claim 1, further comprising the step of said write data path converting user data to media data for said inter-track interference mitigation.

6. The method of claim 1, wherein said inter-track interference mitigation can be selectively enabled for a given sector of data.

7. The method of claim 1, wherein said inter-track interference mitigation is performed in real-time with said read operation for at least one adjacent sector.

8. The method of claim 1, wherein said inter-track interference mitigation generates inter-track interference corrected data and wherein said inter-track interference mitigation is performed in combination with a post-processing procedure to post-process said inter-track interference corrected data.

9. The method of claim 1, wherein said inter-track interference mitigation is performed in combination with a post-processing procedure to perform inter-track interference mitigation on post-processed data.

10. The method of claim 1, wherein said inter-track interference mitigation is performed upon a failure of said read operation.

11. The method of claim 1, wherein said inter-track interference mitigation for a given sector uses stored data from one or more of a prior read operation and a prior post-processing operation.

12. The method of claim 1, wherein a two-sided inter-track interference mitigation for a given sector is first performed using cancellation data for a first adjacent sector followed by inter-track interference mitigation using cancellation data for a second adjacent sector.

13. The method of claim 12, wherein said inter-track interference mitigation for said second adjacent sector is performed without re-reading said given sector from a magnetic media.

14. The method of claim 1, wherein said inter-track interference mitigation is selectively performed for a given read operation for one or more neighboring sectors.

15. The method of claim 1, wherein said inter-track interference mitigation is sequentially performed for sectors in N neighboring tracks.

16. The method of claim 1, wherein inter-track interference mitigation for a given sector is automatically performed using cancellation data for sectors in at least two of said adjacent tracks.

17. The method of claim 1, wherein inter-track interference mitigation for a given sector is automatically performed using cancellation data for two sectors in at least two of said adjacent tracks using post-processed data.

18. The method of claim 1, wherein said write data path provides said inter-track interference cancellation data during a read operation to an inter-track interference mitigation circuit when said inter-track interference mitigation is enabled.

19. The method of claim 1, wherein said write data path encodes user data to media data and passes said media data to an analog write data path during a write operation.

20. The method of claim 1, wherein said inter-track interference mitigation circuit mitigates inter-track interference from one or more of ADC samples and Y-Data.

21. The method of claim 1, wherein said providing step is performed during a read operation.

22. The method of claim 1, wherein said inter-track interference mitigation circuit generates processed data for said given track.

23. The method of claim 22, further comprising the step of decoding said processed data for said given track.

24. An apparatus for mitigation of inter-track interference (ITI) in a magnetic recording system, comprising:
    a read data path; and
    a write data path for providing inter-track interference cancellation data for one or more adjacent tracks that are adjacent to a given track to an inter-track interference mitigation circuit in said magnetic recording system.

25. The apparatus of claim 24, wherein said inter-track interference cancellation data is obtained from a memory that is external to said write data path.

26. The apparatus of claim 24, wherein said inter-track interference cancellation data comprises one or more of user data and media data.

27. The apparatus of claim 24, wherein said write data path operates substantially simultaneously with said read data path performing said read operation.

28. The apparatus of claim 24, further comprising means for selectively enabling said inter-track interference mitigation for a given sector of data.

29. The apparatus of claim 24, further comprising means for generating a first control signal that is asserted substantially simultaneously with a read gate signal to initiate said inter-track interference mitigation.

30. The apparatus of claim 24, further comprising means for generating a second control signal that indicates a use of one or more of data from a prior read operation and post-processed data for said inter-track interference mitigation.

31. The apparatus of claim 29, wherein said first control signal is asserted substantially simultaneously with a second control signal that indicates a use of one or more of data from a prior read operation and post-processed data for said inter-track interference mitigation, to perform said inter-track interference mitigation on stored samples.

32. A magnetic recording system, comprising:
  a read data path; and
  means for generating a retry control signal that indicates a use of one or more of stored data from a prior read operation by said read data path and stored data from a prior post processing operation.

* * * * *